(12) United States Patent
Kim et al.

(10) Patent No.: US 12,346,484 B2
(45) Date of Patent: Jul. 1, 2025

(54) USER TERMINAL DISPLAYING INTERFACE FOR PROVIDING INSTANT MESSAGING SERVICE AND OPERATION METHOD OF THE USER TERMINAL

(71) Applicant: KAKAO CORP., Jeju-si (KR)

(72) Inventors: You Jin Kim, Seongnam-si (KR); Jung Woo Choi, Seongnam-si (KR); Jenog Ryeol Choi, Seongnam-si (KR); Joong Seon Kim, Seongnam-si (KR); Hong Chan Yun, Seongnam-si (KR); Ju Ho Chung, Seongnam-si (KR); Do Hyun Youn, Seongnam-si (KR); Hyung Min Kim, Seongnam-si (KR); Hyun Ok Choi, Seongnam-si (KR); Chun Ho Kim, Seongnam-si (KR); Bo Kyung Kim, Seongnam-si (KR)

(73) Assignee: KAKAO CORP., Jeju-si (KR)

(*) Notice: Subject to any disclaimer, the term of this patent is extended or adjusted under 35 U.S.C. 154(b) by 233 days.

(21) Appl. No.: 18/319,230

(22) Filed: May 17, 2023

(65) Prior Publication Data

US 2023/0376635 A1    Nov. 23, 2023

(30) Foreign Application Priority Data

May 18, 2022   (KR) .................. 10-2022-0061003

(51) Int. Cl.
| | |
|---|---|
| *G06F 21/62* | (2013.01) |
| *G06F 3/0481* | (2022.01) |
| *G06F 3/0482* | (2013.01) |
| *G06F 16/955* | (2019.01) |
| *G06F 21/31* | (2013.01) |
| *G06Q 50/50* | (2024.01) |

(Continued)

(52) U.S. Cl.
CPC .......... *G06F 21/629* (2013.01); *G06F 3/0481* (2013.01); *H04L 51/046* (2013.01); *G06F 2221/2149* (2013.01)

(58) Field of Classification Search
CPC ................ G06F 21/629; G06F 3/0481; G06F 2221/2149; G06F 3/0482; G06F 16/955; G06F 21/31; H04L 51/046; H04L 51/212; G06Q 50/50
See application file for complete search history.

(56) References Cited

U.S. PATENT DOCUMENTS

| | | | |
|---|---|---|---|
| 10,951,564 B1 * | 3/2021 | Delp | ....................... H04L 51/56 |
| 11,398,999 B1 * | 7/2022 | Shrestha | ............ G08B 21/0269 |

(Continued)

FOREIGN PATENT DOCUMENTS

| | | |
|---|---|---|
| KR | 101654261 B1 | 9/2016 |
| KR | 10-2017-0016011 A | 2/2017 |

(Continued)

*Primary Examiner* — Darren B Schwartz
(74) *Attorney, Agent, or Firm* — Seed IP Law Group LLP

(57) ABSTRACT

A user terminal according to an embodiment may include a processor configured to: based on accessing an instant messaging server with a user account and the user account being a general account, display a general interface for a plurality of services provided to the general account; and based on the user account being a protected account, display a protected interface in which at least some of the plurality of services provided to the general account is restricted.

17 Claims, 14 Drawing Sheets

(51) Int. Cl.
*H04L 51/046* (2022.01)
*H04L 51/212* (2022.01)

(56) References Cited

U.S. PATENT DOCUMENTS

| | | | | |
|---|---|---|---|---|
| 11,468,520 | B2* | 10/2022 | Chang | G06Q 50/40 |
| 11,687,980 | B2* | 6/2023 | Kim | G06Q 30/0269 |
| | | | | 705/14.66 |
| 11,893,214 | B2* | 2/2024 | Triverio | H04L 65/4015 |
| 2002/0049806 | A1 | 4/2002 | Gatz et al. | |
| 2004/0111479 | A1* | 6/2004 | Borden | H04L 9/40 |
| | | | | 709/206 |
| 2004/0193684 | A1* | 9/2004 | Ben-Yoseph | H04L 67/54 |
| | | | | 709/204 |
| 2005/0080851 | A1* | 4/2005 | Kent | G06Q 10/107 |
| | | | | 709/205 |
| 2006/0294189 | A1* | 12/2006 | Natarajan | H04L 67/1063 |
| | | | | 709/206 |
| 2007/0136475 | A1* | 6/2007 | Leppisaari | H04L 65/1069 |
| | | | | 709/227 |
| 2007/0150341 | A1* | 6/2007 | Zia | G06Q 30/0269 |
| | | | | 705/14.66 |
| 2008/0071881 | A1* | 3/2008 | Kronlund | G06Q 30/02 |
| | | | | 709/217 |
| 2011/0276634 | A1* | 11/2011 | Maruyama | G06F 13/385 |
| | | | | 709/205 |
| 2013/0024516 | A1* | 1/2013 | Blinder | G06Q 50/01 |
| | | | | 709/204 |
| 2013/0040629 | A1* | 2/2013 | Sprigg | H04N 21/25841 |
| | | | | 455/419 |
| 2013/0152171 | A1* | 6/2013 | Kindler | H04L 63/0846 |
| | | | | 726/4 |
| 2013/0219517 | A1* | 8/2013 | Yerli | G06F 21/31 |
| | | | | 726/28 |
| 2013/0304721 | A1* | 11/2013 | Fakeih | G06F 16/337 |
| | | | | 707/710 |
| 2014/0173003 | A1* | 6/2014 | Van | H04W 4/12 |
| | | | | 709/206 |
| 2015/0348185 | A1* | 12/2015 | Frost | G06Q 40/02 |
| | | | | 705/35 |
| 2016/0164859 | A1* | 6/2016 | Vidal | H04L 51/42 |
| | | | | 705/37 |
| 2016/0205111 | A1* | 7/2016 | Byrne | H04L 63/08 |
| | | | | 726/4 |
| 2016/0301639 | A1* | 10/2016 | Liu | H04L 51/52 |
| 2018/0077254 | A1* | 3/2018 | Appelman | H04L 51/04 |
| 2020/0403947 | A1* | 12/2020 | Fogu | G06Q 50/01 |
| 2021/0118013 | A1* | 4/2021 | Ham | G06Q 50/01 |
| 2021/0374744 | A1* | 12/2021 | McLachlan | H04L 63/102 |

FOREIGN PATENT DOCUMENTS

| | | |
|---|---|---|
| KR | 10-2019-0056773 A | 5/2019 |
| KR | 10-2021-0003253 A | 1/2021 |

* cited by examiner

USER TERMINAL DISPLAYING INTERFACE FOR PROVIDING INSTANT MESSAGING SERVICE AND OPERATION METHOD OF THE USER TERMINAL

CROSS-REFERENCE TO RELATED APPLICATIONS

This application claims priority under 35 USC § 119(a) to Korean Patent Application No. 10-2022-0061003 filed on May 18, 2022, in the Korean Intellectual Property Office, the disclosure of which is incorporated by reference herein in its entirety.

BACKGROUND

Technical Field

The following description relates to a server providing an instant messaging service (IMS) and an operation method of the server.

Description of Related Art

The advancement in mobile smart devices has increased the use of online platform services for interaction with other users over a network. The online platform services for interaction with other users may include, as representative examples, a social networking service (SNS) which is an online platform for generating and consolidating social relationships through communication among users, information sharing, and expansion of personal connections, and an instant messaging service (IMS) which is an online platform for real-time content communication between two or more users. Such an increasing interaction between users via mobile devices has further allowed the online platform services to support a function of providing various services based on communication between users in addition to a chat service for daily conversation with other users.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present disclosure, an operation method of a user terminal includes: accessing an instant messaging server with a user account; based on the user account being a general account, displaying a general interface for a plurality of services provided to the general account; and based on the user account being a protected account, displaying a protected interface in which at least some of the plurality of services provided to the general account are restricted, The displaying of the protected interface may include displaying, of an integrated search result based on a user input in an instant messaging service (IMS), content associated with the at least some service restricted for the protected account is excluded.

The displaying of the protected interface may include displaying an interface with an advertisement removed.

The displaying of the protected interface may include restricting access that is based on the protected account to a non-friend-based chatroom accessible using a link.

The displaying of the protected interface may include displaying an interface from which a graphical representation for executing a web search function based on a keyword input in a chatroom is removed.

The displaying of the general interface may include, based on the user account being a protector account connected to another account that is the protected account, displaying a protector interface for a management service for managing the other account.

The displaying of the protector interface may include displaying an interface for setting at least one of a friend list, an access-allowed link, or an available time of the other account that is the protected account.

The operation method may further include: in response to the user account changing from the protected account to the general account, stopping displaying the protected interface to start displaying the general interface; and in response to the user account changing from the general account to the protected account, stopping displaying the general interface to start displaying the protected interface.

The operation method may further include: requesting to add a business account as a friend; and based on the user account being the protected account, providing a guidance message about restricting adding the business account to a friend list of the user account.

The operation method may further include displaying a notification message received via the instant messaging server, from the business account to the user account.

The operation method may further include: receiving, from the instant messaging server, a message including link; and based on the user account being the protected account, restricting displaying an image associated with the link.

The operation method may further include: based on that a link selected in an instant messaging application accessed with the user account that is the protected account indicates access to a chatroom, displaying information associated with the access to the chatroom within the instant messaging application; and based on that the link selected in the instant messaging application accessed with the user account that is the protected account indicates access to a page other than the chatroom, transmitting the link to an external browser application.

The operation method may further include: based on a link being selected in the instant messaging application, transmitting, to the instant messaging server, a link connection request for a connection to the selected link; based on an approval reply from another account that is the protector account connected to the user account that is the protected account, receiving a page corresponding to the link from the instant messaging server; and based on a rejection reply from the other account that is the protector account, restricting the connection to the link.

The transmitting of the link connection request may include: displaying a guidance message about transmitting an approval request for the link connection request to the other account that is the protector account connected to the user account that is the protected account; and based on that a confirmation reply to the guidance message about transmitting the approval request is selected, transmitting the link connection request.

The operation method may further include displaying a guidance message corresponding to a reply from the other account that is the protector account connected to the user account that is the protected account.

The operation method may further include: based on the user account being the protector account connected to another account that is the protected account, transmitting, to the instant messaging server, an available time setting request for setting an available time for the other account that is the protected account.

The operation method may further include: based on the user account being the protected account, receiving, from the instant messaging server, information associated with an available time set by another account that is the protector account connected to the user account; and based on a use time not being comprised in the received information associated with the available time, restricting at least one of a plurality of services provided to the protected account.

The operation method may further include: based on obtaining a cancellation request during restriction of the at least one service, allowing the restricted at least one service for a predetermined time length from a time point at which the cancellation request is obtained; and based on a lapse of the predetermined time length from the time point at which the cancellation request is obtained, re-restricting the allowed at least one service.

According to an aspect of the present disclosure, a user terminal includes: a processor configured to: access an instant messaging server with a user account; based on the user account being a general account, display a general interface for a plurality of services provided to the general account; and based on the user account being a protected account, display a protected interface in which at least some of the plurality of services provided to the general account is restricted.

Other features and aspects will be apparent from the following detailed description, the drawings, and the claims.

BRIEF DESCRIPTION OF THE SEVERAL VIEWS OF THE DRAWINGS

The above and other features of certain embodiments of the present disclosure will be more apparent from the following detailed description, taken in conjunction with the accompanying drawings, in which.

DETAILED DESCRIPTION

Figure 1:
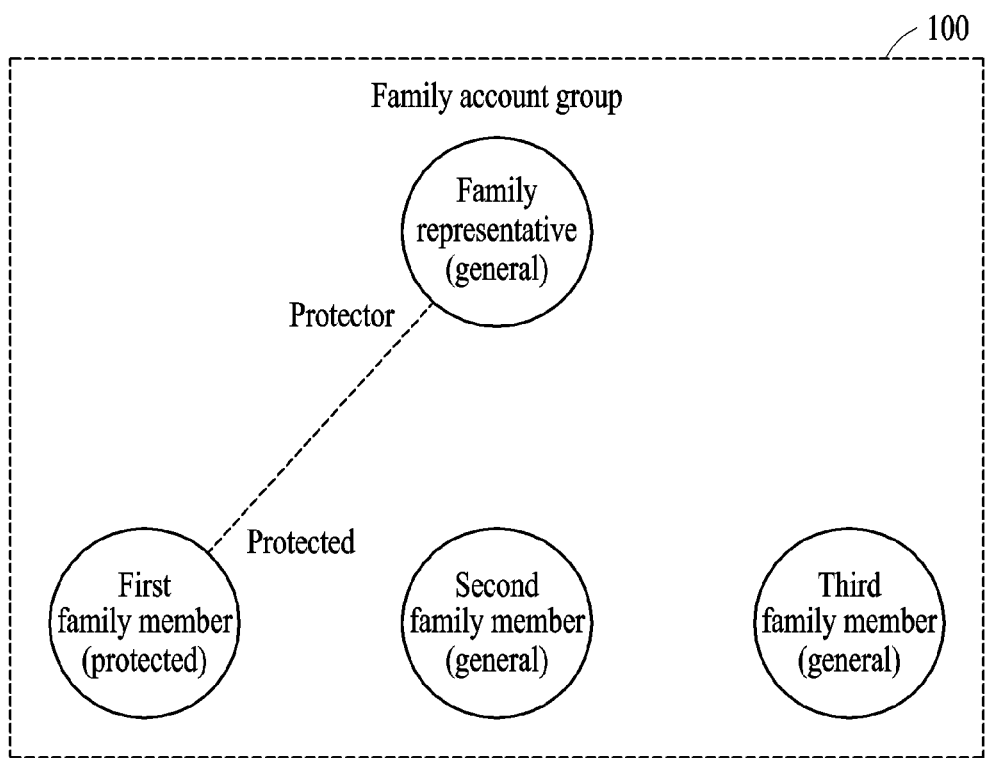
FIG. 1 illustrates an example family account group of an instant messaging service (IMS) according to an embodiment.

The following detailed structural or functional description is provided only for the purpose of providing examples, and various alterations and modifications may be made to the examples. Here, the examples are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that, if one component is described as being "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the disclosure of the present application and is not to be interpreted in an idealized or overly formal sense unless expressly so defined herein.

Hereinafter, example embodiments will be described in detail with reference to the accompanying drawings. When describing the embodiments with reference to the accompanying drawings, like reference numerals refer to like components and a repeated description related thereto will be omitted.

FIG. 1 illustrates an example family account group of an instant messaging service (IMS) according to an embodiment.

According to an embodiment, a family account group 100, which is a set of one or more user accounts, may include a family representative account and a family member account.

A user account may be created as a user subscribes to a service (e.g., a social networking service (SNS), an IMS, or the like) provided by a server, and the server may serve as a service platform that provides the service to the user account subscribing to the service. The server may include an instant messaging server that provides an IMS.

The IMS may provide real-time online communication between two or more users who have installed the same instant messenger. An instant messenger may include a messenger application, and the IMS may include a service that enables the messenger application to deliver messages between users who have accounts for the IMS.

The IMS may include a user and a server as subjects. The user may be a client of the IMS and may access the server via a user terminal in which the messenger application is installed.

A user terminal, which is an electronic device such as a computer, a portable computer, a wireless phone, a mobile phone, a smartphone, a personal digital assistant (PDA), a web tablet, and the like, may be a device that enables installation and execution of an instant messaging application associated with the server. In this case, the user terminal may perform overall operations of the service including, for example, configuring a service screen, inputting data, transmitting and receiving data, and storing data, under the control of the application. For example, the user terminal may access the server through the application. The user terminal may receive the service using the user account, and thus the user account described herein may be construed as substantially the user terminal.

The family representative account may be an account that represents the family account group among user accounts included in the family account group. The family member account may be another user account (e.g., a remaining user account), excluding the family representative account, among the user accounts included in the family account group. For example, the server may generate a family account group including one user account. In this example, the server may set the user account as a family representative account. For example, a terminal accessed with the family representative account may transmit, to the server, a request (e.g., a family add request) for adding a family member account to the family account group. The server may then add the family member account to the family account group based on the family add request. The family member account may be one of a protected account and another account (e.g., a general account) that is different from the protected account.

The protected account, which is of one account type of user account, may be an account subscribed by a person who is defined by a service provider as one requiring protection or guardianship. For example, the protected account may be an account subscribed by a person with limited legal capacity (e.g., a minor under the age of 14, an adult ward, a limited ward, and the like). The protected account may be connected to a protector account. Based on whether the protected account is connected to the protector account, the user terminal and/or the server may restrict a service to be provided to the protected account.

The protector account may be an account connected to the protected account. The protector account may be selected from among user accounts each being a general account in the family account group. The general account, which is of one account type of user account distinguished from the protected account, may be an account subscribed by a general person (e.g., one who is not a minor, an adult ward, or a limited ward). The general account may include, for example, the protector account connected to the protected account.

For example, in a case in which at least one of family member accounts in a family account group is a protected account, a family representative account may be connected as a protector account to the protected account. However, examples are not limited thereto, and another user account that is not the family representative account but is a general account may be connected as the protector account to the protected account. Also, a user terminal accessed with the family representative account may select the protector account for the protected account from among general accounts included in the family account group.

The present specification mainly describes an example case in which the protected account is an account created by a minor under the age of 14, and the protector account is an account created by a parent of the minor. For example, the protector account may be an account created based on a subscription to an IMS by a protector or guardian (e.g., a parent), and the protected account may be an account created based on a subscription to the IMS by a protected or ward (e.g., a child). However, this example is provided for the convenience of description, and examples are not limited thereto.

For example, in a case of a subscription to an IMS by a first user (e.g., a child) who meets the requirements of a minor (e.g., one under the age of 14), consent of a second user (e.g., a parent) may be required to create an account of the first user (i.e., a first user account). For example, the server and/or a first user terminal of the first user may request a second user terminal of the second user to consent to the creation of the first user account. In response to obtaining the consent from the second user to the creation of the first user account, the server may determine whether there is a family account group associated with an account of the second user (i.e., a second user account). In the presence of the family account group (e.g., a family account group that includes the second user account as a family representative account) associated with the second user account, the server may receive, from the second user terminal accessed with the second user account, a family add request for adding the first user account to the family account group. Based on the family add request, the server may add the first user account to the family account group. The server may receive a protector and protected connect request from the second user terminal. Based on the protector and protected connect request, the server may set the first user account as a protected account and the second user account as a protector account connected to the first user account.

As shown in FIG. 1, a family account group may include a family representative account, a first family member account, a second family member account, and a third family member account. The family representative account may be a general account, the first family member account may be a protected account, and the second family member account and the third family member account in the family account group may each be a general account. The family representative account may be connected as a protector account to the first family member account which is the protected account.

There may be a probability that a protected (e.g., a user under the age of 14) using an IMS receives a message from a dangerous third party (e.g., a criminal) via the IMS. In this case, a protector may manage and/or control the use of the IMS by the protected to allow the protected to use the IMS safely.

Figure 2:
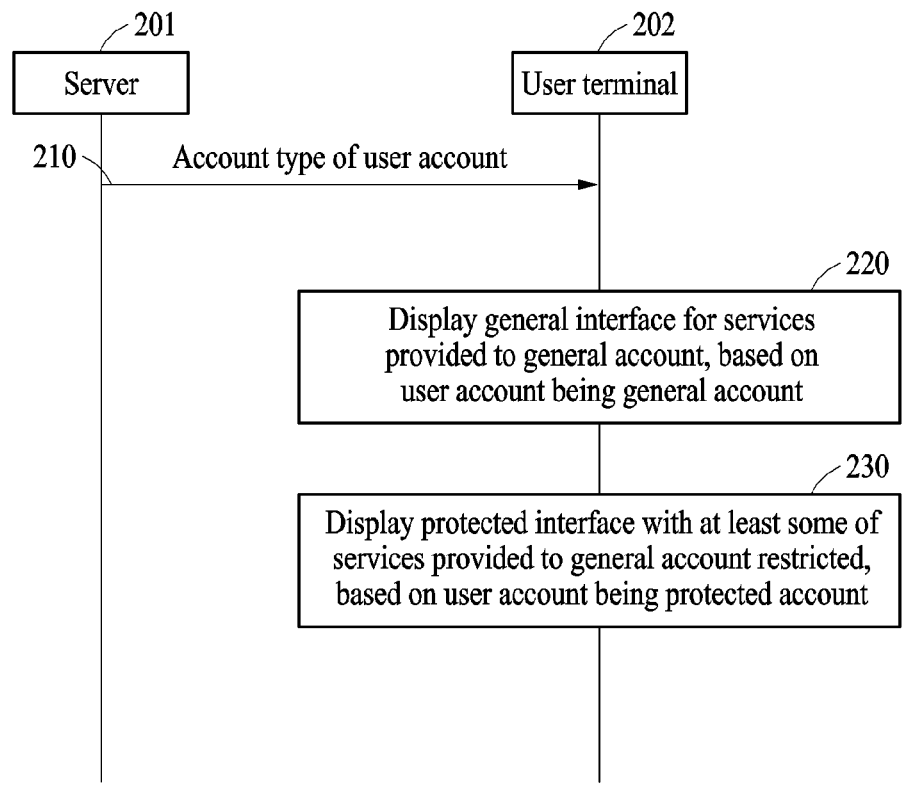
FIG. 2 illustrates an interface displaying operation of a user terminal according to an embodiment.

FIG. 2 illustrates an interface displaying operation of a user terminal according to an embodiment.

A user terminal 202 may connect to an instant messaging server 201 (hereinafter simply referred to as the server 201) with a user account. The user terminal 202 may be a terminal that connects to an IMS with the user account. The IMS may be a service provided by the server 201.

In operation 210, the server 201 may transmit an account type of the user account to the user terminal 202. The user terminal 202 may receive the account type of the user account from the server 201. For example, the server 201 may transmit, to the user terminal 202, the account type of the user account being a protected account. The user terminal 202 may then receive, from the server 201, the account type of the user account being the protected account. For another example, the server 201 may transmit, to the user terminal 202, the account type of the user account being a general account (e.g., a protector account) that is connected to another account that is the protected account. The user terminal 202 may then receive, from the server 201, the account type of the user account being the general account (e.g., the protector account) that is connected to the other account that is the protected account.

According to an embodiment, the server 201 may transmit the account type of the user account to the user terminal 202 at a predetermined interval (e.g., every minute). According to an embodiment, the server 201 may transmit the account type of the user account to the user terminal 202 during communication between the user terminal 202 and the server 201. For example, the server 201 may transmit the account type of the user account when transmitting a message to the user terminal 202. For another example, the server 201 may transmit the account type of the user account, based on receiving an inquiry request for a message from the user terminal 202. For still another example, the server 201 may transmit the account type of the user account based on the user terminal 202 changing and displaying an interface (e.g., changing from an interface for a chat service to an interface for a friend service).

The user account may be an account stored as a protected account in the server 201. The server 201 may transmit, to the user terminal 202, the user account being the protected account. The user terminal 202 may then receive, from the server 201, the account type of the user account being the protected account. In a case in which the user account that is the protected account and a protector account are disconnected, the account type of the user account may be changed from the protector account to a general account. The server 201 may then store the account type of the user account as the general account. The server 201 may then transmit, to the user terminal 202, the account type of the user account being the general account. The user terminal 202 may receive, from the server 201, the account type of the user account being the general account.

According to an embodiment, the server 201 may selectively transmit, to the user terminal 202, the account type of the user account based on the account type of the user account. For example, in a case in which the user account is either the protected account or the protector account, the server 201 may transmit the account type of the user account to the user terminal 202. For another example, in a case in which the user account is of another account type that is different from the protected account and the protector account, the server 201 may omit to transmit the account type of the user account to the user terminal 202. For example, in a case in which the user account is the general account that is not connected to another account that is the protected account, the server 201 may not transmit the account type of the user account to the user terminal 202. When the user terminal 202 does not receive the account type of the user account from the server 201, the user terminal 202 may determine that the user account is the general account that is not connected to another account that is the protected account.

In operations 220 and 230, the user terminal 202 may display an interface based on the account type of the user account. Instead of displaying a single uniform interface, the user terminal 202 may provide a customized interface based on the account type of the user account. The user terminal 202 may display either a general interface or a protected interface based on the account type of the user account.

In operation 220, based on the user account being the general account, the user terminal 202 may display the general interface. The general interface may include an interface for a plurality of services provided to the general account. The plurality of services may be all of services included in the IMS. The plurality of services may be services provided within an instant messaging application and may include, for example, a chat service (e.g., a real name chat service, an anonymous chat service, a non-friend-based chat service accessible via a link (hereinafter referred to as an open chat service), a payment service (e.g., a pay service), a channel service, a shopping service, a gift service, and an emoticon service. The server 201 may provide all of the plurality of services included in the IMS to the general account, for example, without restriction. Based on the user account being the general account, the user terminal 202 may display the general interface for all of the plurality of services. The general interface may further include an interface for settings of the plurality of services, in addition to the interface for the plurality of services.

For reference, the open chat service is a chat service accessible through a link provided by Kakao, the Applicant of the present disclosure, and may specifically include a non-friend-based open chat service provided by the KakaoTalk application of Kakao. A chatroom of the open chat service may be a chatroom of the open chat service provided by Kakao. The open chat service provided by Kakao is an example of the non-friend-based open chat service, and the non-friend-based open chat service is not limited thereto. Also, "Open Chat" is a registered trademark of Kakao, the Applicant.

In operation 230, based on the user account being the protected account, the user terminal 202 may display the protected interface. The protected interface may be an interface in which at least some of the plurality of services provided to the general account is restricted. The server 201 may provide an IMS for a protected for which at least some of the plurality of services is restricted. Some restricted services may be services that pose a potential risk to the protected and may include, for example, at least one of a channel service, an anonymous chat service, a shopping service, or a payment service. The protected interface may further include an interface in which settings for some restricted services are excluded. For example, the protected interface may include an interface for settings of services provided to the protected account, excluding some services restricted to the protected account.

According to an embodiment, the user terminal 202 may display the protected interface with a target service at least partially restricted. The target service may be one or more services that are restricted to the protected account. The protected interface may include an interface in which at least one of paths to access the target service is restricted.

For example, based on the user account being the general account, the user terminal 202 may display the general interface including a plurality of paths to access the target service. Based on the user account being the protected account, the user terminal 202 may display the protected interface in which at least one of the plurality of paths to access the target service is restricted. For example, the user terminal 202 may display an interface that includes some restricted paths and some other paths among the plurality of paths to the target service and may thus provide, to the protected, an interface with adjusted accessibility to the target service.

At least some of the plurality of services included in the IMS may be required to be partially restricted to the protected, rather than completely restricted to the protected. That is, instead of the services being completely prohibited through restrictions on all the accessible paths, the accessibility to the services may be adjusted such that the services are made available through restrictions on some of the accessible paths. The accessibility to the target service may be adjusted by the number of accessible paths to the target service included in the interface.

According to an embodiment, in a case in which the account type of the user account changes, the user terminal 202 may change the interface.

For example, the account type of the user account may change from the protected account to the general account. In a case in which the age of the user becomes greater than a reference age (e.g., 14 years old) for the protected account, or another account that is the protector account connected to the user account that is the protected account is disconnected, the account type of the user account may change from the protected account to the general account. The server 201 may store the changed account type of the user account as the general account. The server 201 may then transmit the account type (e.g., the general account) of the user account to the user terminal 202. Alternatively, based on the account type of the user account being the general account that is not connected to another account that is the protected account, the server 201 may stop transmitting the account type of the user account to the user terminal 202. The user terminal 202 may display the general interface that is changed from the protected interface based on such a change in account type. The user terminal 202 may stop displaying the protected interface and start displaying the general interface.

For another example, the user account may change from the general account to the protected account. In a case in which the user account is connected to another account of the protector by the protector of the user, the account type of the user account may change from the general account to the protected account. The server 201 may store the changed account type of the user account as the protected account. The server 201 may transmit the account type (e.g., the protected account) of the user account to the user terminal 202. The user terminal 202 may display the protected interface that is changed from the general interface based on such a change in account type. The user terminal 202 may stop displaying the general interface and start displaying the protected interface.

According to an embodiment, the protected interface may include an interface that includes, of an integrated search result by a user input in the IMS, a result from which content associated with some of the services restricted to the protected account is excluded. An example of the protected interface for the integrated search result will be described below with reference to FIG. 3.

In an embodiment, the protected interface may include an interface with restricted access to a non-friend-based chatroom (e.g., a chatroom of the open chat service) that is accessible using a link, based on the protected account. The protected interface in which a non-friend-based chatroom accessible using a link is restricted will be described below with reference to FIG. 3.

According to an embodiment, the protected interface may include an interface from which advertisements (ads) are removed. An example of the protected interface with ads removed will be described below with reference to FIG. 4.

According to an embodiment, the protected interface may include an interface from which graphical representations for executing a web search function based on a keyword input in a chatroom are removed. An example of the protected interface with the graphical representations for executing a web search function removed will be described below with reference to FIG. 5.

Figure 3:
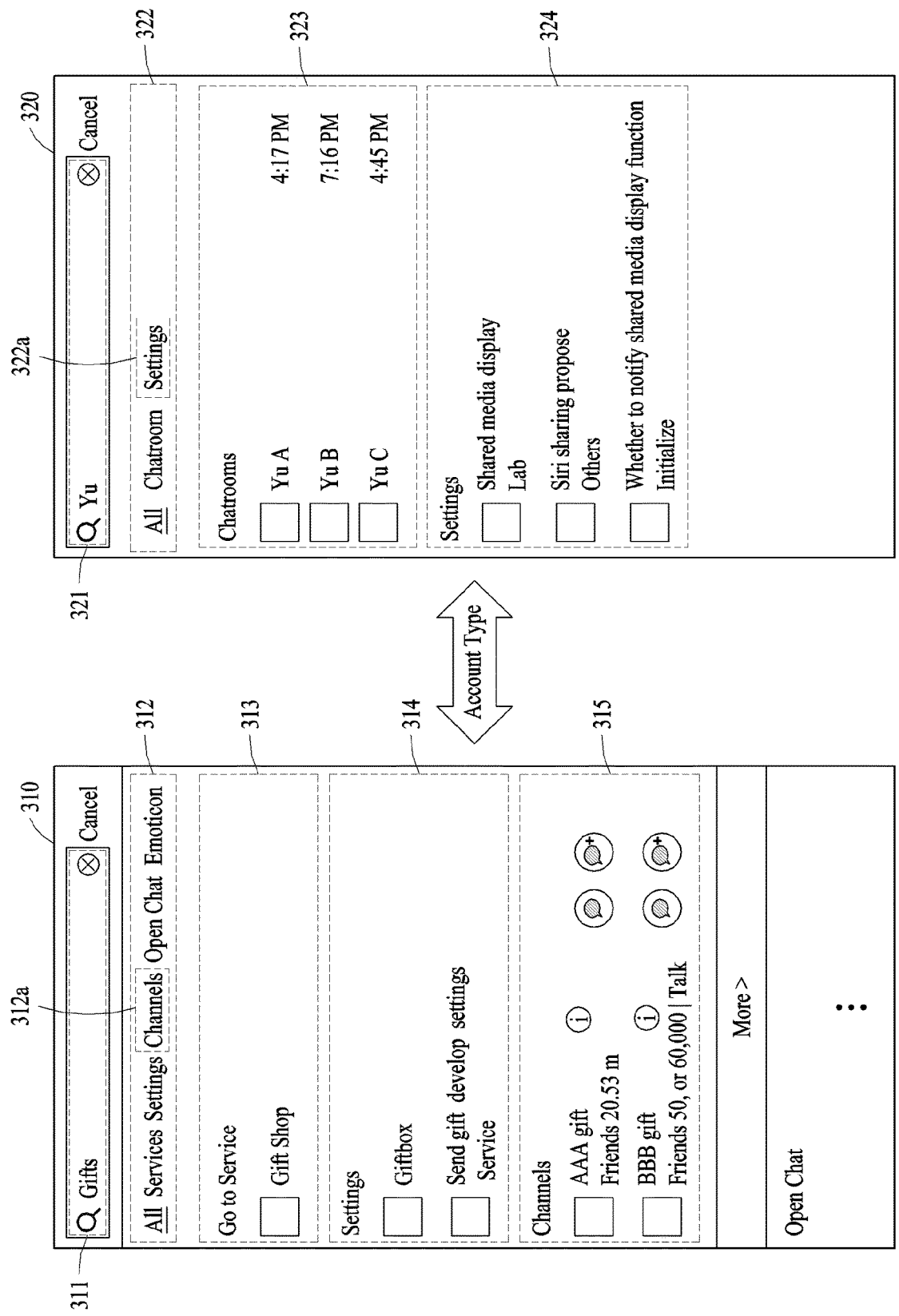
FIG. 3 illustrates an example general interface and an example protected interface for an integrated search result according to an embodiment.

FIG. 3 illustrates an example general interface and an example protected interface for an integrated search result according to an embodiment.

Based on a user account being a general account, a user terminal may display a general interface for a plurality of services provided to the general account. The general interface may include an interface that includes an integrated search result based on a user input in an IMS. The integrated search result, which is a result of a search performed on the IMS, may be a result of searching for a plurality of services included in the IMS and/or contents associated with the services, based on a user input.

The contents associated with the services may include user-selectable products (e.g., emoticons), chatrooms, and/or accounts that are provided by the services.

For example, content associated with a friend list service may include one or more other user accounts that are included in a friend list of the user account. The friend list of the user account may be a list of one or more other user accounts connected as friends to the user account.

For another example, content associated with a chat service may include chatrooms in which the user account participates. For another example, content associated with an open chat service may include chatrooms of an open chat service. For another example, content associated with an emoticon service may include various emojis and emoticons.

For another example, an item associated with a channel service may include one or more business accounts registered in the IMS. The channel service may be a service that allows a user to add a business account registered in the IMS to the friend list of the user account, and transmit an inquiry message to the business account or receive a notification message from the business account. The business account, which is an example of a user account for using the IMS, may be an account for a specific business entity. The business account may be used to provide advertising messages and/or notification messages (e.g., messages about delivery, orders, or payments) of a specific business entity to users who are consumers through the IMS. The business account may also be referred to as a channel.

The integrated search result based on a user input may include services having names, at least part of which is the same as the user input. In addition, the integrated search result based on a user input may further include contents having names, at least part of which is the same as the user input.

A name of content may include a name representative of the content. For example, a name representative of content (e.g., one or more other user accounts included in a friend list) associated with a friend list service may be a stored name of another user account included in the friend list. For another example, a name representative of content (e.g., each emoticon and emoji) associated with an emoticon service may be a name of each emoticon or emoji.

A name of content may include a name of a component of the content in addition to a name representative of the content. For example, a name of content (e.g., a group chatroom) associated with a group chat service may include a name of each of a plurality of accounts participating in a group chatroom, in addition to a name of the group chatroom.

Based on the user account being a protected account, the user terminal may display a protected interface with at least some services restricted. The protected interface may include a result, excluding content associated with some services restricted to the protected account from the integrated search result. For example, in a case in which the emoticon service is restricted to the protected account, the protected interface may include an interface that excludes, from the integrated search result, an emoticon service having a name of which at least a part is the same as a user input and content associated with the emoticon service.

According to an embodiment, as shown in a general interface 310 of FIG. 3, the user terminal may display the general interface 310 for a plurality of services based on the user account being a general account. The general interface 310 may include an input window 311 for receiving a user input. The general interface 310 may display an integrated search result based on a user input obtained via the input window 311. The general interface 310 may include a sub-interface (e.g., a sub-interface 313 for displaying a service) for displaying a service associated with a user input among the plurality of services. As described above, a service associated with a user input may be a service having a name of which at least a part is the same as the user input.

Based on an input (e.g., a touch input) detected in a service input area 312, the user terminal may display a search result including content associated with a service corresponding to the input. For example, based on detecting a touch input in a channel-related area 312a of the service input area 312, the user terminal may display an interface that includes content associated with a channel service of an integrated search result.

The general interface 310 may further include a sub-interface that displays, for each service, contents associated with a user input among contents associated with the plurality of services. For example, the general interface 310 may further include a sub-interface 315 for a channel service that displays contents (e.g., one or more business accounts) associated with the channel service. In addition, the general interface 310 may include a sub-interface 314 for settings that displays contents (e.g., one or more menus) associated with settings for the services.

According to an embodiment, as shown in a protected interface 320 of FIG. 3, the user terminal may display the protected interface 320 in which at least some of the plurality of services is restricted based on the user account being a protected account.

The protected interface 320 may include an input window 321 for receiving a user input. The protected interface 320 may display an integrated search result based on a user input obtained via the input window 321.

The protected interface 320 may include a sub-interface (not shown) for displaying services among services associated with a user input, and the sub-interface for displaying the services may exclude a service restricted to the protected account. Even in a case in which there is a service provided to the general account associated with the user input, the service may be excluded from the sub-interface for displaying the services in the protected interface 320, when the service is restricted to the protected account.

For example, a non-friend-based chat service accessible via a link (e.g., an open chat service) may be restricted to the protected account. In this example, the user terminal may display a result, excluding the open chat service and/or content associated with the open chat service from the integrated search result. For example, the user terminal may display a result, excluding a chatroom of the open chat service from the integrated search result. By displaying a protected interface that excludes the chatroom of the open chat service, the user terminal may restrict protected account-based access to a non-friend-based chatroom accessible using a link. For reference, when receiving a message including a link indicating access to a chatroom, the user terminal may restrict access to a chatroom of an open chat service, which will be described below with reference to FIG. 11.

Based on an input (e.g., a touch input) detected in a service input area 322, the user terminal may display a search result that includes content associated with a service corresponding to the input. For example, based on detecting a touch input in a setting-related area 322a of the service input area 322, the user terminal may display an interface that includes, of an integrated search result, content associated with settings. The service input area 322 of the protected interface 320 may exclude a service restricted to the protected account. For example, unlike the service input area 312 of the general interface 310, the service input area 322 of the protected interface 320 may exclude areas corresponding to a channel service, an open chat service, and an emoticon service, which are restricted to a protected.

The protected interface 320 may further include a sub-interface that excludes content associated with a restricted service for the protected account, among contents associated with a user input. Even in a case in which there is a content associated with a user input, the content may be excluded from the protected interface 320 when a service of the content is a restricted service for the protected account. The protected interface 320 may include a sub-interface for each service. A sub-interface for a restricted service for the protected account may be excluded from the protected interface 320.

As shown in FIG. 3, the protected interface 320 may include a sub-interface 323 for a chat service that displays content (e.g., one or more chatrooms) associated with the chat service. The protected interface 320 may include a sub-interface 324 for settings that displays content (e.g., one or more menus) associated with settings for a service. In a case in which a channel service is a restricted service for the protected account, a sub-interface for the channel service may be excluded from the protected interface 320 even when there is content associated with the channel service based on a user input. For reference, unlike the protected interface 320 that excludes the channel service and the content associated with the channel service, the general interface 310 may include the sub-interface 315 for the channel service.

Figure 4:
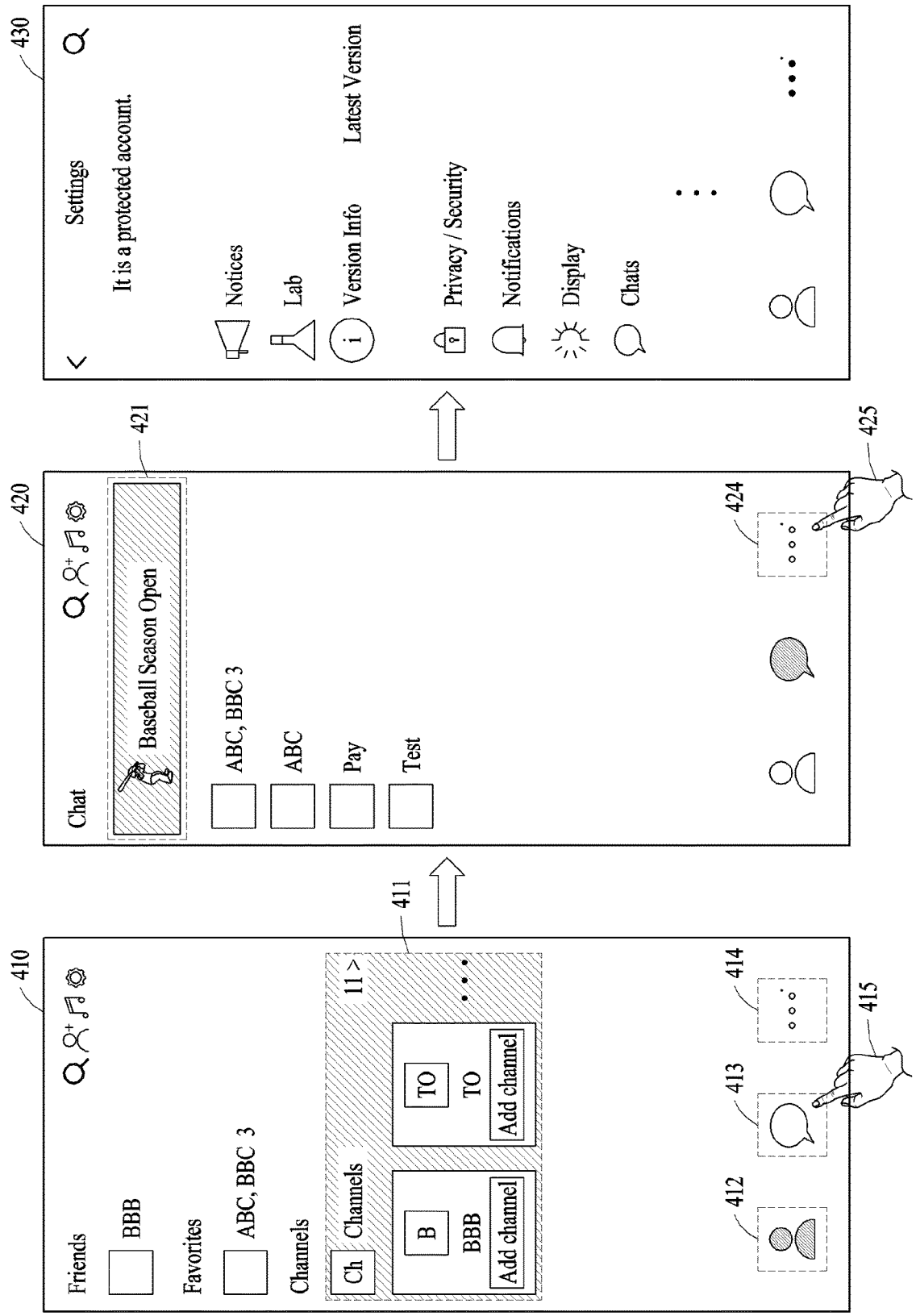
FIG. 4 illustrates an example protected interface with advertisements (ads) removed according to an embodiment.

FIG. 4 illustrates an example protected interface with ads removed according to an embodiment.

According to an embodiment, a user terminal may display a protected interface in which at least some of a plurality of services is restricted, based on a user account being a protected account. For example, a channel service may be a restricted service for a protected.

Based on the user account being the protected account, the user terminal may display an interface with the restricted services for the protected account.

For example, to provide a friend list service to the protected, the user terminal may display the protected interface for the friend list service. For reference, a general interface for the friend list service may include an area 411 for a channel service. The area 411 for the channel service may include an area for an inquiry request for one or more business accounts added to a friend list of the user account and an area for ads about adding another business account to the friend list of the user account.

In a case in which the channel service is restricted to the protected account, the area 411 for the channel service may be included in the general interface, but excluded from the protected interface. In the protected interface, displaying the area 411 for the channel service may be omitted.

Although not shown in FIG. 4, the general interface may include, in addition to an area for access to the friend list service and an area for access to a chat service, an area for access to a multimedia content providing service, an area for access to a shopping service, and an area for access to other service groups (e.g., a payment service, an emoticon service, and settings for a service).

A protected interface 410 may include an area 412 for access to a friend list service, an area 413 for access to a chat service, and an area 414 for access to settings. However, areas for access to a multimedia content providing service and a shopping service that are restricted services for the protected account may be excluded from the protected interface 410.

Based on detecting an input 415 in the area 413 for access to the chat service, the user terminal may display an interface 420 for the chat service. Based on the user account being the protected account, the user terminal may display a protected interface for the chat service. In this case, the protected interface may include an interface from which ads are removed. A general interface for the chat service may include an ad display area 421 to which ads are exposed. The protected interface for the chat service may include an interface from which the ad display area 421 is excluded. In the protected interface for the chat service, displaying the ad display area 421 may be omitted.

Based on detecting an input 425 in an area 424 for access to settings, the user terminal may display an interface 430 for settings. Based on the user account being the protected account, the user terminal may display a protected interface for settings. For reference, the general interface may include an area for access to other service group, instead of the area 424 for access to settings. In a case in which at least some of an emoticon service, a gift service, and a payment service included in the other service group are at least partially restricted for the protected account, the area for access to the other service group may be excluded from the protected interface. Instead, the protected interface may include the area for access to settings to be provided (e.g., not restricted) to the protected interface, of the other service group provided to the general account.

Figure 5:
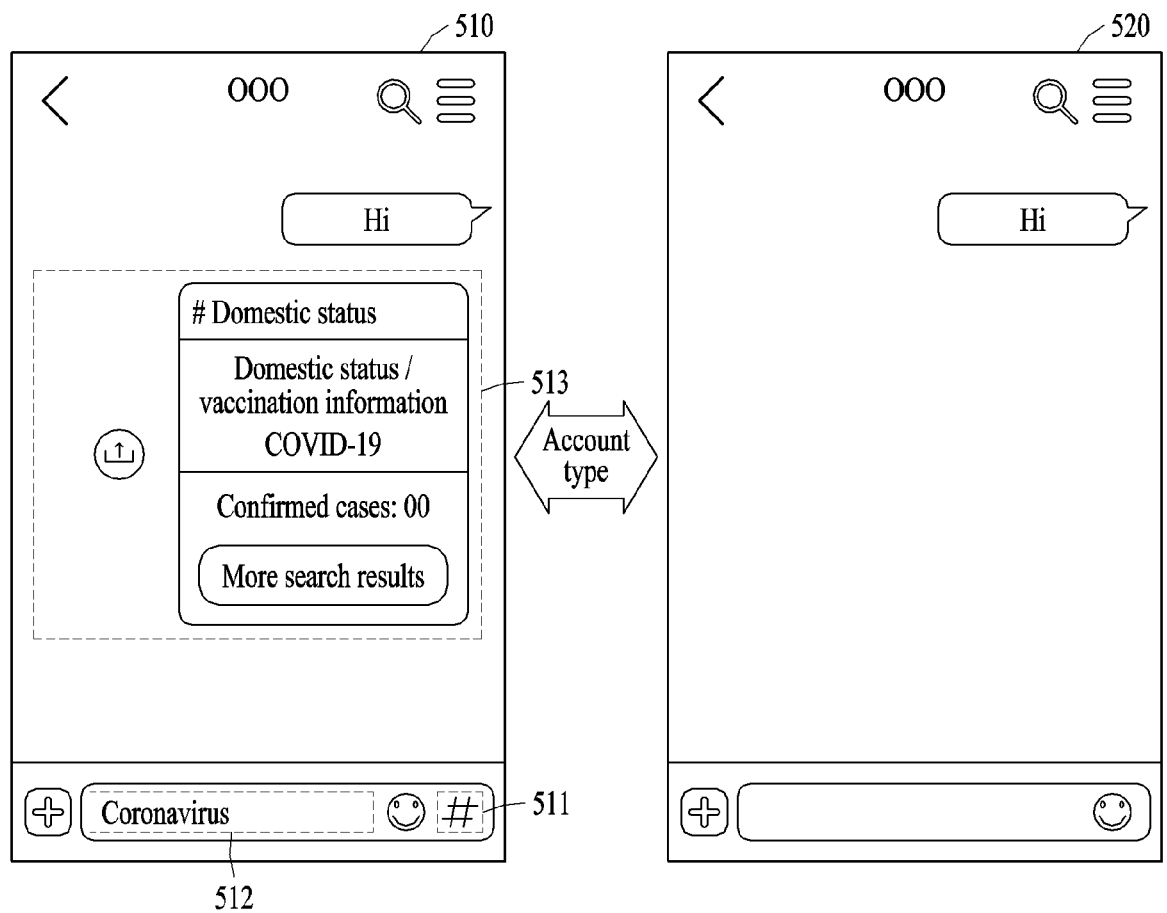
FIG. 5 illustrates an example general interface and an example protected interface for a chatroom according to an embodiment.

FIG. 5 illustrates an example general interface and an example protected interface for a chatroom according to an embodiment.

According to an embodiment, an IMS may provide a web search function (or a web search service) in a chatroom. A chatroom interface may include an input window 512 for inputting a character string for chatting. The chatroom interface may include a graphical representation 511 for executing the web search function based on an input keyword in the chatroom. For example, the graphical representation 511 may be a graphical representation for changing a mode of the chatroom between a chat mode and a search mode. In response to a character string being input through the input window 512 in the chat mode, a user terminal may request a server to transmit a message that is based on the character string to another user account in the chatroom. In response to a character string being input through the input window 512 in the search mode, the user terminal may request the server for a web search that is based on the character string. For example, the graphical representation 511 for executing the web search function may correspond to a delimiter. The delimiter may include one or more symbols, for example, a hash sign, #.

Based on detecting an input in the graphical representation 511 corresponding to the delimiter, the user terminal may execute the web search function. For example, when detecting a touch input in an area of the graphical representation 511 corresponding to the delimiter, the user terminal may change the mode of the chatroom from the chat mode to the search mode. The user terminal may receive, as an input, a keyword for a web search through the input window 512. The user terminal may transmit a web search request that is based on the input keyword to the server. The server may then perform the web search based on the web search request received from the user terminal and transmit a web search result that is based on the input keyword to the user terminal. The user terminal may receive the web search result from the server. The user terminal may display information 513 about the web search result.

As shown in FIG. 5, based on the user account being a general account, the user terminal may display a general interface 510 for a chatroom with a web search function. The general interface 510 may include a graphical representation 511 for executing the web search function in the chatroom. The graphical representation 511 of the general interface 510 may be used to switch a mode of a chat input window, in addition to executing the web search function. Based on detecting an input (e.g., a touch input) in the graphical representation 511, the user terminal may switch the mode of the chat input window between a chat mode and a search mode. For example, based on detecting the input in the graphical representation 511, the user terminal may change the mode from the chat mode to the search mode, or from the search mode to the chat mode.

According to an embodiment, the web search function (or the web search service) in a chatroom may be restricted for a protected account. Based on the user account being the protected account, the user terminal may display a protected interface 520 with the web search function restricted in the chatroom. The user terminal may display the protected interface 520 from which a graphical representation for executing the web search function in the chatroom is removed. By displaying the protected interface 520 with the graphical representation (e.g., the graphical representation 511) removed, the user terminal may restrict the web search function in the chatroom for the protected account. For example, the user terminal may restrict switching the mode of the chatroom from the chat mode to the search mode.

Figure 6:
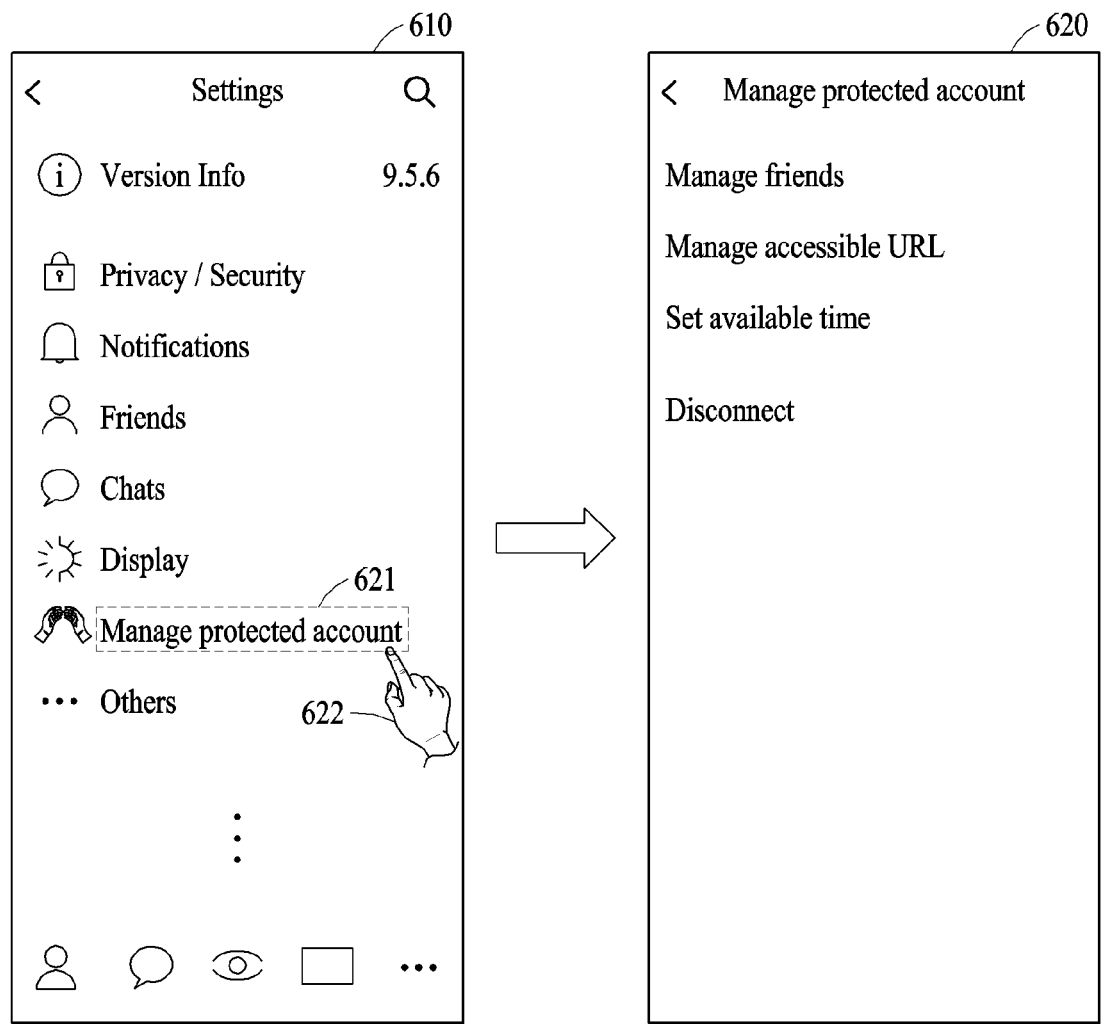
FIG. 6 illustrates an IMS setting interface of a user terminal accessed with a protector account according to an embodiment.

FIG. 6 illustrates an IMS setting interface of a user terminal accessed with a protector account according to an embodiment.

According to an embodiment, based on a user account being a general account, a user terminal may display a general interface for a plurality of services provided to the general account. Based on the user account being a protector account connected to another account that is a protected account, the user terminal may display a protector interface. The protector interface may include an interface for services for the protected account. The services for the protected account may include a management service for managing the other account that is the protected account. The management service for the other account that is the protected account may include, for example, a management service for at least one of a friend list of the other account, a link to which access is allowed, or an available time.

For example, based on the user account being the protector account, the user terminal may display a protector interface 610 for setting an IMS. The protector interface 610 for setting may include an area 621 corresponding to services for a protected account connected to the user account. When detecting an input (e.g., a touch input) in the area 621, the user terminal may display an interface 620 for the services for the protected account. As shown in FIG. 6, the user terminal may display an interface for setting at least one of a friend list of another account that is the protected account, a link to which access is allowed, or an available time.

Figure 7:
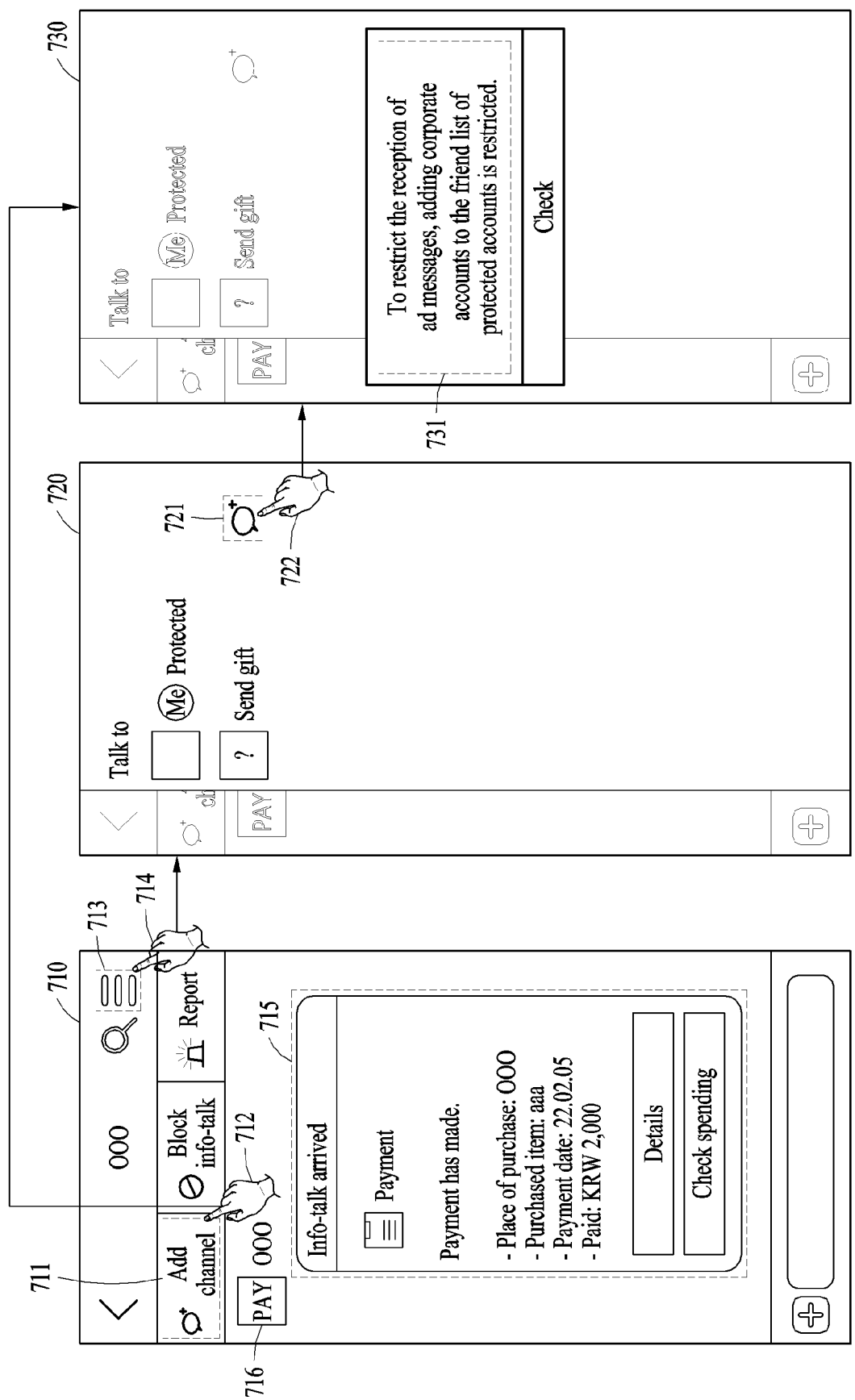
FIG. 7 illustrates restriction on adding a business account to a friend list of a protected account according to an embodiment.

FIG. 7 illustrates restriction on adding a business account to a friend list of a protected account according to an embodiment.

A user terminal may make a friend add request for adding as a friend a business account. Adding a business account may represent a request for adding a business account to a friend list of a user account. Based on the user account being a protected account, the user terminal may restrict the addition of the business account to the friend list of the user account. The user terminal may provide a guidance message about restricting the addition of the business account to the friend list of the user account.

When the addition of the business account to the friend list of the user account is restricted, transmitting an advertising message from the business account to the user account may be restricted. For example, the transmission of the advertising message through an instant messaging server from the business account to the user account may be allowed when the friend list of the user account includes the business account. Thus, restricting the addition of the business account to the friend list of the user account that is the protected account may prevent an indiscriminate transmission of advertising messages from the business account to the protected account.

Even when the addition of a business account is restricted for the protected account, the user terminal may display a notification message received from the business account through the instant messaging server. The user terminal may display the notification message from the business account to the user account, even when the user account is the protected account in addition to the user account being a general account. The notification message, which is a message distinguished from an advertising message for promoting a business account, may be a message including information that is required to be notified to the user. For example, the notification message may be a message including information about payment and/or delivery.

As shown in FIG. 7, according to an embodiment, a user terminal may display an interface 710 including a notification message 715 received from a business account via an instant messaging server. The user terminal may display the notification message 715 through the interface 710 for a chatroom corresponding to the business account. For example, the notification message 715 may include payment information. The payment information may include, for example, at least one of a place of a purchase, a name of a purchased item, a payment date, a paid sum, and a payment method.

The user terminal may make a friend add request for adding, as a friend, the business account corresponding to the chatroom.

For example, the user terminal may display the interface 710 further including a channel add area 711 for the business account corresponding to the chatroom, in addition to the notification message 715. Based on detecting an input (e.g., a touch input) 712 in the channel add area 711, the user terminal may make the friend add request for the business account.

For another example, the user terminal may display the interface 710 further including a chat participant inquiry area 713, in addition to the notification message 715. Based on detecting an input (e.g., a touch input) 714 in the chat participant inquiry area 713, the user terminal may display a chat participant inquiry interface 720. The chat participant inquiry interface 720 may include a friend add area 721 for a user account that is not included in a friend list of the user account among chat participants. Based on detecting an input (e.g., a touch input) 722 in the friend add area 721 corresponding to the business account, the user terminal may make the friend add request for the business account.

Based on the friend add request for adding the business account to the friend list of the user account that is a protected account, the user terminal may display an interface 730 including a guidance message 731. The guidance message 731 may include a message about restricting addition of the business account to the friend list of the user account that is the protected account.

According to an embodiment, based on the user account being a general account, the user terminal may display a general interface including a profile (or a home) of the business account. Based on the user account being the protected account, the user terminal may display an interface with the display of the profile of the business account restricted.

The user terminal may display the interface 710 further including a business account profile inquiry area 716. The business account profile inquiry area 716 may be activated or deactivated according to an account type of the user account.

For example, based on the user account being the general account, the user terminal may activate the business account profile inquiry area 716. Based on detecting an input (e.g., a touch input) in the business account profile inquiry area 716, the user terminal may request to display the profile of the business account. Based on the user account being the general account, the user terminal may display an interface including the profile of the business account.

For another example, based on the user account being the protected account, the user terminal may deactivate the business account profile inquiry area 716. Based on the user account being the protected account, the user terminal may disregard the input (e.g., the touch input) detected in the business account profile inquiry area 716. For example, based on the user account being the protected account, displaying the profile of the business account may be restricted regardless of whether an input is detected in the business account profile inquiry area 716. The profile of the business account may be likely to include an advertising message, and thus, based on the user account being the protected account, the user terminal may restrict the display of the profile of the business account to prevent a protected from being exposed to an ad that is based on the profile of the business account.

Figure 8:
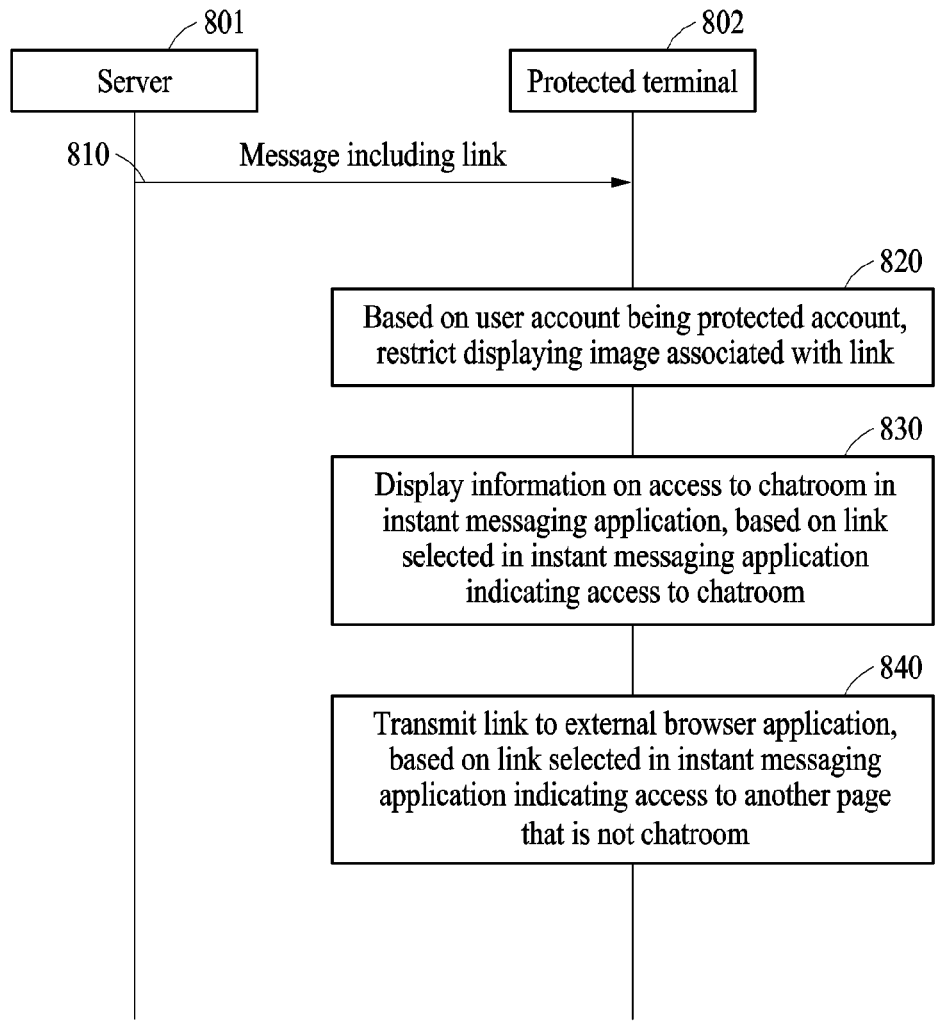
FIG. 8 illustrates an operation of processing a message including a link in a protected account according to an embodiment.
Figure 9:
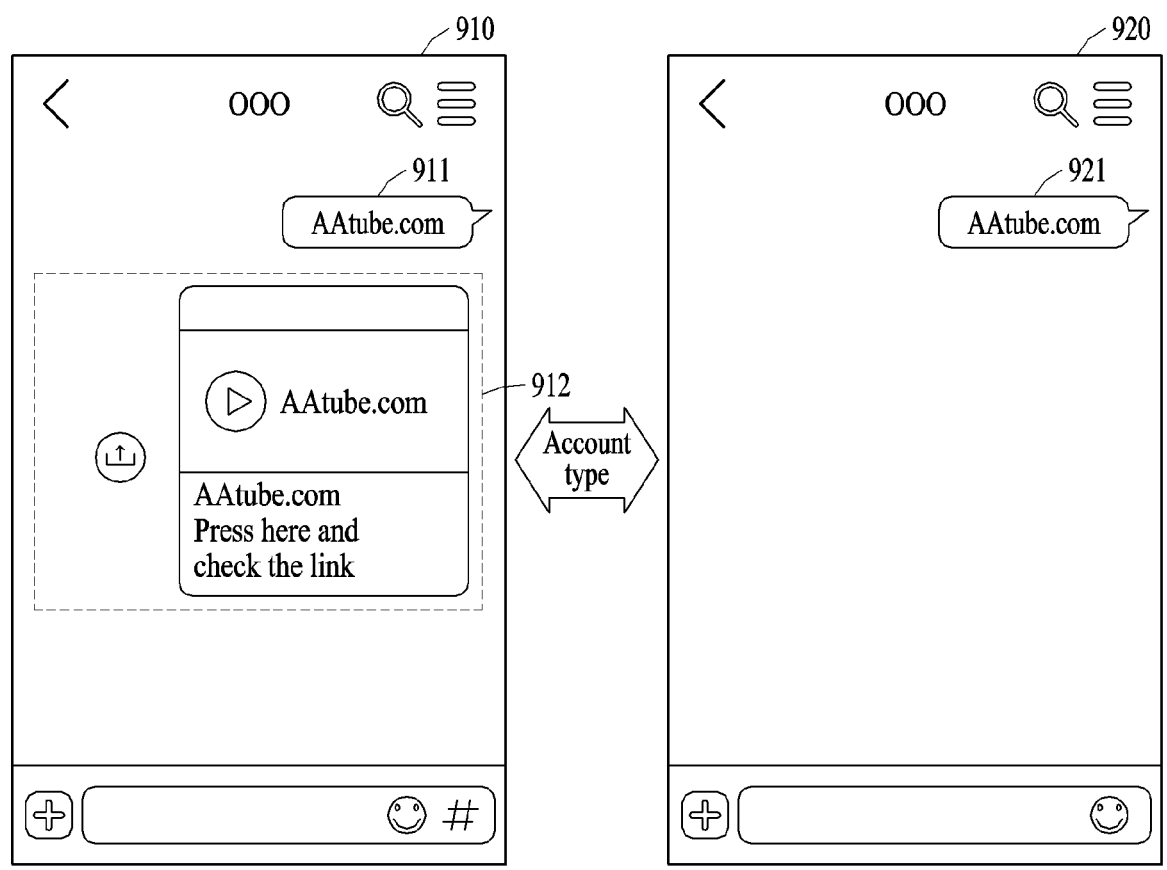
FIG. 9 illustrates an example general interface and an example protected interface including a message including a link according to an embodiment.

FIG. 8 illustrates an operation of processing a message including a link for a protected account according to an embodiment. FIG. 9 illustrates an example general interface and an example protected interface including a message including a link according to an embodiment.

FIG. 8 illustrates an operation of processing a message including a link in a protected account according to an embodiment. FIG. 9 illustrates an example general interface and an example protected interface including a message including a link according to an embodiment.

According to an embodiment, in operation 810, a server 801 may transmit a message including a link to a protected terminal 802. The protected terminal 802 may receive the message including the link from the server 801. The protected terminal 802 may be a user terminal accessed with a user account that is a protected account. The link may indicate a path to a web page for connecting to the web page (or simply referred to herein as a page).

In operation 820, based on the user account being the protected account, the protected terminal 802 may restrict displaying an image associated with the link.

A user terminal accessed with a user account that is a general account may display the image of the link, based on the user account being the general account. The user terminal may provide, through the image associated with the link, at least a portion of the web page corresponding to the link before connecting to the link. The image associated with the link may include an image corresponding to at least a portion of the web page. The image associated with the link may include, for example, an image extracted from a video and/or image included in the web page. For example, in a case of the link corresponding to the web page including a video, the image associated with the link may be a thumbnail of the video and include an image that is based on at least one frame of the video. For reference, for example, the image associated with the link may be generated by an instant messaging server (or a scrape server distinguished from the instant messaging server).

As shown in FIG. 9, based on the user account being the general account, the user terminal may display a general interface 910. Based on receiving a message 911 including a link, the general interface 910 may display an image 912 associated with the link. Based on the user account being the protected account, the user terminal may display a protected interface 920. Based on receiving a message 921 including a link, the user terminal may restrict displaying an image associated with the link. For example, the protected interface 920 may include an interface from which the image associated with the link is excluded.

A protected terminal may detect that a link is selected in an instant messaging application. For example, based on an input (e.g., a touch input) detected in an area corresponding to the link, the protected terminal may detect that the link is selected in the instant messaging application.

Based on the selection of the link from the message, the protected terminal may perform an operation for access to a page corresponding to the link. For example, the link may indicate access to a chatroom. A non-friend-based chatroom that is accessible using a link may be a chatroom of an open chat service, and the link indicating access to a chatroom may be a link to the chatroom of the open chat service. The link may also indicate access to a page that is different from a chatroom.

According to an embodiment, the protected terminal 802 may determine whether to process the link within the instant messaging application based on whether the link indicates access to a chatroom.

According to an embodiment, the protected terminal 802 may transmit, to the server 801, a link connection request for connecting to the selected link. The link connection request may include information corresponding to the link, for example, a uniform resource locator (URL) or a web address. The server 801 may receive the link connection request from the protected terminal 802. The server 801 may determine whether the link is to be processed within the instant messaging application based on whether the selected link indicates access to a chatroom. The server 801 may transmit, to the protected terminal 802, whether the link is to be processed within the instant messaging application. The protected terminal 802 may then receive, from the server 801, whether the link is to be processed within the instant messaging application. Based on such received information as to whether the link is to be processed within the instant messaging application, the protected terminal 802 may perform an operation for access to a page corresponding to the link.

The protected terminal 802 may process the link by displaying information associated with the access to the page corresponding to the link within the instant messaging application or by transmitting the link to an external browser application.

In operation 830, based on the selected link indicating access to a chatroom (or a chatroom of an open chat service), the protected terminal 802 may process the link within the instant messaging application. The protected terminal 802 may display information associated with the access to the chatroom (or the chatroom of the open chat service) within the instant messaging application. The information associated with the access to the chatroom may include at least one of a name of the chatroom of the open chat service, a guidance message about the chatroom of the open chat service, a keyword describing the characteristics of the chatroom of the open chat service, or an image of the chatroom of the open chat service.

In operation 840, based on the selected link indicating another page that is not the chatroom, the protected terminal 802 may process the link through the external browser application. For example, a protected terminal may transmit a link to an external browser application. The protected terminal may access a page corresponding to the link through the external browser application or may restrict the access to the page.

In a case in which the selected link indicates access to a page different from a chatroom, the protected terminal may process the link through the external browser application. The external browser application, which is an application distinguished from the instant messaging application, may include a web browser installed on the protected terminal to access a web page. For example, the protected terminal may transmit the link to the external browser application to allow the link to be processed through a program (e.g., a block program that blocks a certain web page) installed in advance for protecting a protected. According to an embodiment, a server providing an IMS may achieve protection for a protected, simply by using such a pre-installed program, rather than processing directly the link indicating the access to the page different from the chatroom.

Based on the selected link indicating access to a chatroom, the protected terminal may process the link within the instant messaging application. It may be difficult for the protected terminal to process the link indicating access to a chatroom through the external browser application. Accordingly, a link to a chatroom of an open chat service indicating the access to a chatroom, which is difficult to be processed through the external browser application, may be processed through the instant messaging service, and a link indicating a page accessible through the external browser application may be processed through the external browser application. As such, the IMS may thus be implemented efficiently.

Although an example in which, based on the selected link indicating access to a chatroom, the protected terminal 802 displays information associated with the access to the chatroom in operation 830 of FIG. 8 has been mainly described above, examples are not limited thereto.

According to an embodiment, based on the selected link indicating access to a chatroom, the protected terminal 802 may exclude a chat service (e.g., the open chat service) through the chatroom corresponding to the link. The protected terminal 802 may display a guidance message about restricting the chat service through the chatroom corresponding to the link. The open chat service, an example of the chat service, may be a chat service provided through a non-friend-based chatroom that is accessible using a link.

In a case in which the open chat service is provided without restriction to a protected account, the chatroom of the open chat service may be accessible using a link to the chatroom of the open chat service, and thus the user account that is the protected account may open a chatroom with another account that has the link to the chatroom of the open chat service or may participate in the opened chatroom of the open chat service. There may be a potential case in which a protected using an IMS receives a message from a dangerous third party (e.g., a criminal) through the open chat service. As a protected terminal restrict at least partially the open chat service for a protected account, the protected may safely use the IMS.

Figure 10:
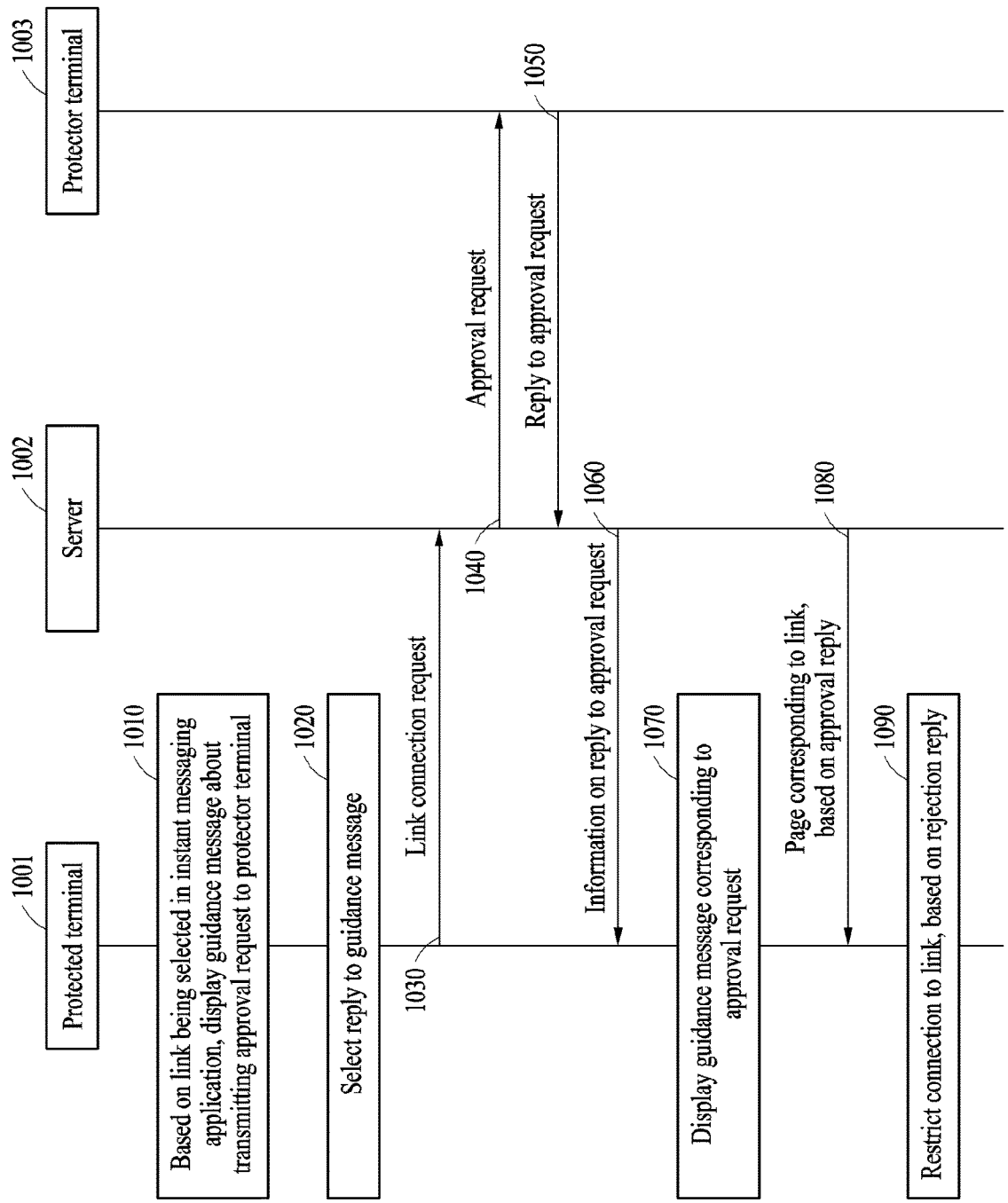
FIG. 10 illustrates an operation of processing a link connection request in an IMS according to an embodiment.

FIG. 10 illustrates an operation of processing a link connection request in an IMS according to an embodiment.

A protected terminal 1001 may detect that a link is selected in an instant messaging application. For example, based on an input (e.g., a touch input) being detected in an area corresponding to the link, the protected terminal 1001 may detect that the link is selected within the instant messaging application.

In operation 1010, based on the link being selected in the instant messaging application, the protected terminal 1001 may display a guidance message. The guidance message may include a message about transmitting, to a protector terminal 1003, an approval request for approving a link connection request. The protected terminal 1001 may be a user terminal accessed with a user account that is a protected account, and the protector terminal 1003 may be another user terminal accessed with another account that is a protector account connected to the user account that is the protected account.

In operation 1020, the protected terminal 1001 may obtain a reply to the guidance message. The reply to the guidance message may include either a confirmation reply or a cancellation reply. The confirmation reply may indicate consent to transmitting the approval request to the protector terminal 1003. The cancelation reply, which is a request for canceling the link connection request, may indicate a rejection of transmitting the approval request to the protector terminal 1003.

Based on obtaining the cancellation reply to the guidance message, the protected terminal 1001 may omit to transmit the link connection request to a server 1002.

In operation 1030, based on the link being selected in the instant messaging application, the protected terminal 1001 may transmit the link connection request to the server 1002. For example, based on obtaining the confirmation reply to the guidance message about transmitting the approval request, the protected terminal 1001 may transmit the link connection request to the server 1002. The server 1002 may then receive the link connection request from the protected terminal 1001. The link connection request may include a request for connecting to a page corresponding to the selected link. The link connection request may include, for example, information about the page corresponding to the selected link.

In operation 1040, the server 1002 may transmit an approval request for approving the link connection request to the protector terminal 1003. The protector terminal 1003 may receive the approval request for the link connection request from the server 1002.

In operation 1050, the protector terminal 1003 may transmit, to the server 1002, a reply to the approval request. The server 1002 may then receive the reply to the approval request from the protector terminal 1003. The reply to the approval request may be either an approval reply or a rejection reply. The approval reply may indicate consent to the link connection request form a protector, and the rejection reply may indicate a rejection of the link connection request from the protector.

In operation 1060, the server 1002 may transmit, to the protected terminal 1001, information about the reply to the approval request received from the protector terminal 1003. The protected terminal 1001 may then receive the information about the reply of the protector account from the server 1002. The information about the reply may indicate either the approval reply or the rejection reply.

According to an embodiment, based on the information about the reply of the protector account received from the server 1002, the protected terminal 1001 may determine a guidance message corresponding to the reply. The protected terminal 1001 may determine the guidance message from between a message corresponding to the approval reply and a message corresponding to the rejection reply.

For example, based on the reply of the protector account to the approval request being the approval reply, the server 1002 may transmit information about the approval reply to the protected terminal 1001. The protected terminal 1001 may then receive the information about the approval reply from the server 1002. Based on the information about the approval reply, the protected terminal 1001 may determine a guidance message corresponding to the approval reply.

For another example, based on the reply of the protector account to the approval request being the rejection reply, the server 1002 may transmit information about the rejection reply to the protected terminal 1001. The protected terminal 1001 may then receive the information about the rejection reply from the server 1002. Based on the information about the rejection reply, the protected terminal 1001 may determine a guidance message corresponding to the rejection reply.

According to an embodiment, the server 1002 may transmit, to the protected terminal 1001, the guidance message corresponding to the reply as the information about the reply to the approval request received from the protector terminal 1003. The protected terminal 1001 may receive, from the server 1002, the guidance message corresponding to the reply of the protector account.

For example, based on the reply of the protector account to the approval request being the approval reply, the server 1002 may transmit the guidance message corresponding to the approval reply to the protected terminal 1001. The protected terminal 1001 may then receive the guidance message corresponding to the approval reply from the server 1002.

For another example, based on the reply of the protector account to the approval request being the rejection reply, the server 1002 may transmit the guidance message corresponding to the rejection reply to the protected terminal 1001. The protected terminal 1001 may then receive the guidance message corresponding to the rejection reply from the server 1002.

In operation 1070, the protected terminal 1001 may display the guidance message corresponding to the reply from another account that is the protector account. The other account that is the protector account may be an account connected to the user account that is the protected account. The guidance message corresponding to the reply may indicate whether the reply to the approval request is the approval reply or the rejection reply.

For example, based on the server 1002 receiving the approval reply to the approval request from the protector terminal 1003, the protected terminal 1001 may display the guidance message corresponding to the approval reply. The guidance message corresponding to the approval reply may include a message indicating that the protector approves of the link connection request. The guidance message corresponding to the approval reply may further include a message indicating that the user terminal accessed with the user account is able to access a page corresponding to the link. The protected terminal 1001 may display a link connection-related area along with the guidance message corresponding to the approval reply.

For another example, based on the server 1002 receiving the rejection reply to the approval request from the protector terminal 1003, the protected terminal 1001 may display the guidance message corresponding to the rejection reply. The guidance message corresponding to the rejection reply may include a message indicating that the protector rejects the link connection request. The guidance message corresponding to the rejection reply may further include a message indicating that the user terminal accessed with the user account is not allowed to access the page corresponding to the link.

In operation 1080, the server 1002 may transmit the page corresponding to the link to the protected terminal 1001. Based on the approval reply of the other account that is the protector account, the protected terminal 1001 may receive the page corresponding to the link from the server 1002. The page corresponding to the link may be at least a portion of a web page that is accessible along a path of the link.

In operation 1090, based on the rejection reply of the other account that is the protector account, the protected terminal 1001 may restrict connecting to the link. Based on the rejection reply of the other account that is the protector account, the protected terminal 1001 may restrict access to the page corresponding to the link. For example, even though the protected terminal 1001 detects an input (e.g., a touch input) in an area corresponding to the link, the server 1002 may restrict transmitting, to the protected terminal 1001, the page corresponding to the link (i.e., may not transmit the page corresponding to the link), based on the rejection reply of the other account that is the protector account. The protected terminal 1001 may restrict receiving the page corresponding to the link from the server 1002 (i.e., may not receive the page corresponding to the link). The protected terminal 1001 may restrict displaying the page corresponding to the link (i.e., may not display the page corresponding to the link). That is, even though an input for the link is detected, the protected terminal 1001 may disregard the detected input, based on the rejection reply of the other account that is the protected account.

According to an embodiment, a link (e.g., a link to a chatroom of an open chat service) selected in the instant messaging application may indicate access to a chatroom (e.g., the chatroom of the open chat service).

In operation 1010, based on the link to the chatroom of the open chat service being selected, the protected terminal 1001 may display a guidance message about transmitting an approval request to the protector terminal 1003.

In operation 1020, a confirmation reply to the guidance message may be selected.

In operation 1030, the protected terminal 1001 may transmit, to the server 1002, a link connection request for connecting to the link to the chatroom of the open chat service. The link connection request may include a request for displaying information about access to the chatroom of the open chat service that is accessible using the link to the chatroom of the open chat service. The server 1002 may then receive the link connection request from the protected terminal 1001.

In operation 1040, the server 1002 may transmit an approval request for approving the link connection request to the protector terminal 1003. The protector terminal 1003 may then receive the approval request for the link connection request from the server 1002.

In operation 1050, the protector terminal 1003 may transmit, to the server 1002, an approval reply to the approval request. The server 1002 may then receive, from the protector terminal 1003, the approval reply to the approval request.

In operation 1060, the server 1002 may transmit, to the protected terminal 1001, information about the approval reply to the approval request. The protected terminal 1001 may then receive, from the server 1002, the information about the approval reply to the approval request.

In operation 1070, the protected terminal 1001 may display a guidance message corresponding to the approval reply to the approval request.

In operation 1080, based on the approval reply, the server 1002 may transmit, to the protected terminal 1001, a page corresponding to the chatroom of the open chat service corresponding to the link to the chatroom of the open chat service. The protected terminal 1001 may then receive, from the server 1002, the page corresponding to the chatroom of the open chat service. The page corresponding to the chatroom of the open chat service may include a page having information associated with access to the chatroom of the open chat service.

For reference, receiving and displaying, by the protected terminal 1001, the page corresponding to the chatroom of the open chat service, and participating in the chatroom of the open chat service may be independent of each other. For example, the protected terminal 1001 may be able to receive and display the page corresponding to the chatroom of the open chat service from the protector account, but in a case in which a chatroom service of the open chat service is restricted for the protected account, the protected account may not be able to participate in the chatroom service of the open chat service. However, examples are not limited thereto, and an additional request may be made to request the protector account to approve the protected account to participate in the chatroom service of the open chat service.

Figure 11:
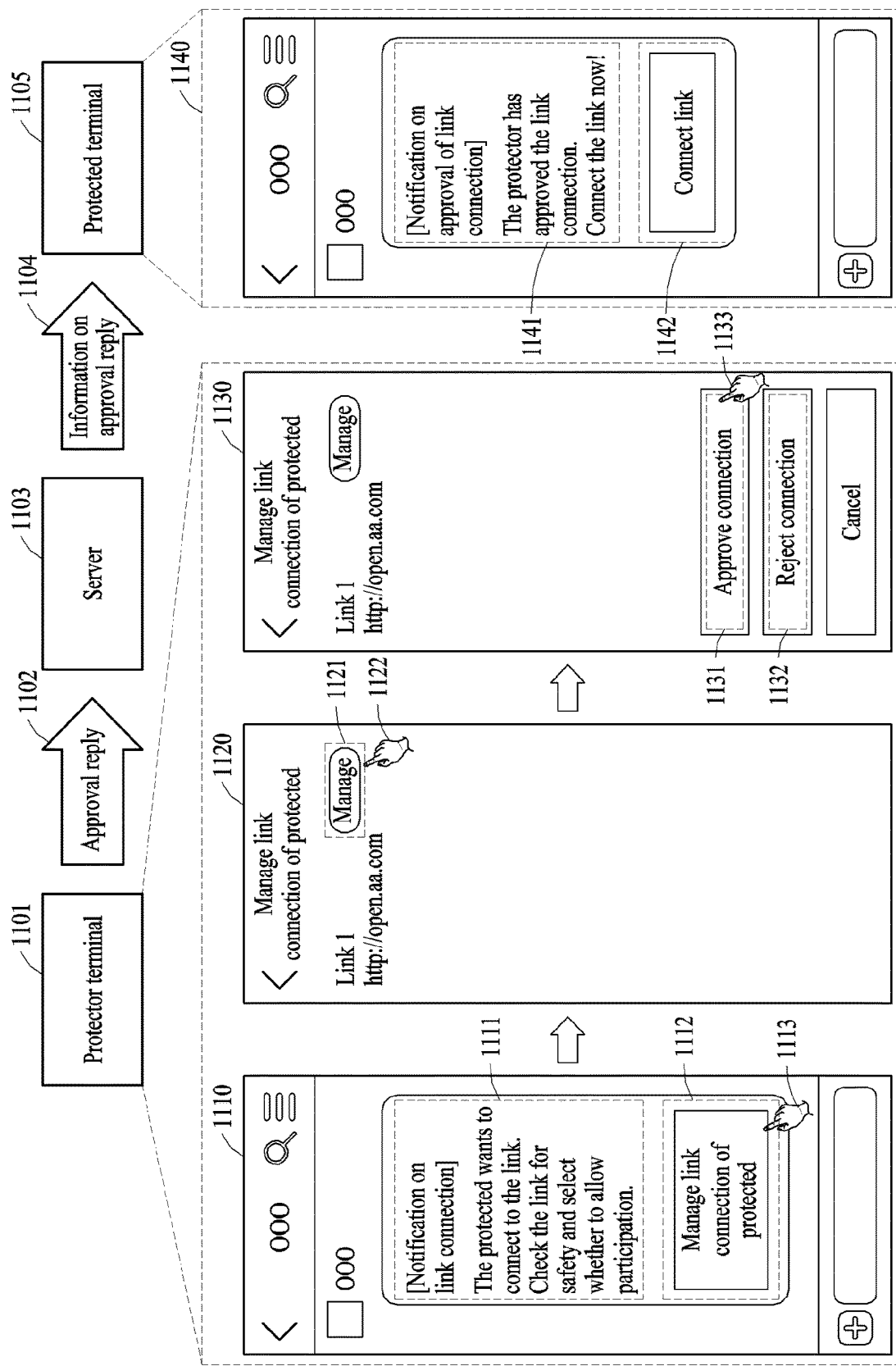
FIG. 11 illustrates an example protected interface and an example protector interface for processing a link connection request in an IMS according to an embodiment.

FIG. 11 illustrates an example protected interface and an example protector interface for processing a link connection request in an IMS according to an embodiment.

As described above, a user terminal accessed with a user account that is a protected account, which is referred to herein as a protected terminal, may transmit a link connection request to a server. Based on receiving the link connection request from the protected terminal, the server may transmit an approval request for approving the link connection request to a protector terminal. The protector terminal may be another user terminal accessed with another user account that is a protector account connected to the user account that is the protected account. FIG. 11 illustrates an example interface of the protector terminal receiving the approval request for the link connection request from the server, and an example interface of the protected terminal based on an approval reply of the protector account.

According to an embodiment, a server 1103 may transmit an approval request for a link connection request to a protector terminal 1101. The protector terminal 1101 may then receive the approval request for the link connection request from the server 1103.

Based on receiving the approval request for the link connection request from the server 1103, the protector terminal 1101 may display a link connection-related approval request interface 1110. For example, the link connection request may be a request for connecting to a first link (indicated as Link 1 in FIG. 11). The approval request for the link connection request may be a request for approving a protected terminal 1105 to receive and/or display a page corresponding to the first link from the server 1103. The approval request interface 1110 may include a guidance message 1111 about the link connection request made by a protected, and a link connection management-related area 1112 for managing links to which access is allowed for the protected account.

Based on detecting an input (e.g., a touch input) in the link connection management-related area 1112, the protector terminal 1101 may display an interface 1120 for managing the links to which access is allowed for the protected account. The interface 1120 for managing the links may include a link management area 1121 for managing individual links. A link in the interface 1120 for managing the links may be a target link for which the link connection request is made by the protected account and may include link information (e.g., a URL or a web address). Although not explicitly shown in FIG. 11, based on detecting an input (e.g., a touch input) in an area corresponding to the link information (e.g., an area on which the link information is displayed), the protector terminal 1101 may request the server 1103 for a page corresponding to the link. To determine whether to approve the protected account to access the link, the protector may access the page corresponding to the link through the protector terminal 1101.

Based on detecting an input (e.g., a touch input) in the link management area 1121, the protector terminal 1101 may display an interface 1130 for determining whether to approve the protected account to access the link corresponding to the link management area 1121. The interface 1130 may include an area 1131 for an approval reply and an area 1132 for a rejection reply.

Based on detecting an input (e.g., a touch input) in the area 1131 for an approval reply, the protector terminal 1101 may transmit an approval reply 1102 to the approval request to the server 1103. The server 1103 may then receive the approval reply 1102 to the approval request from the protector terminal 1101. The server 1103 may transmit information 1104 about an approval reply to the protected terminal 1105. The protected terminal 1105 may then receive the information 1104 about the approval reply from the server 1103. Based on receiving the information 1104 about the approval reply from the server 1103, the protected terminal 1105 may display an interface 1140 including a guidance message 1141 corresponding to the approval reply. The interface 1140 may include a link connection-related area 1142 for connecting to the link, along with the guidance message 1141 corresponding to the approval reply.

Although not explicitly shown in FIG. 11, based on detecting an input (e.g., a touch input) in the area 1132 for a rejection reply, the protector terminal 1101 may transmit, to the server 1103, a rejection reply to the approval request. The server 1103 may then receive the rejection reply to the approval request from the protector terminal 1101. The server 1103 may transmit information (not shown) about the rejection reply to the protected terminal 1105. The protected terminal 1105 may then receive the information about the rejection reply from the server 1103. Based on receiving the information about the rejection reply from the server 1103, the protected terminal 1105 may display an interface (not shown) including a guidance message (not shown) corresponding to the rejection reply.

Figure 12:
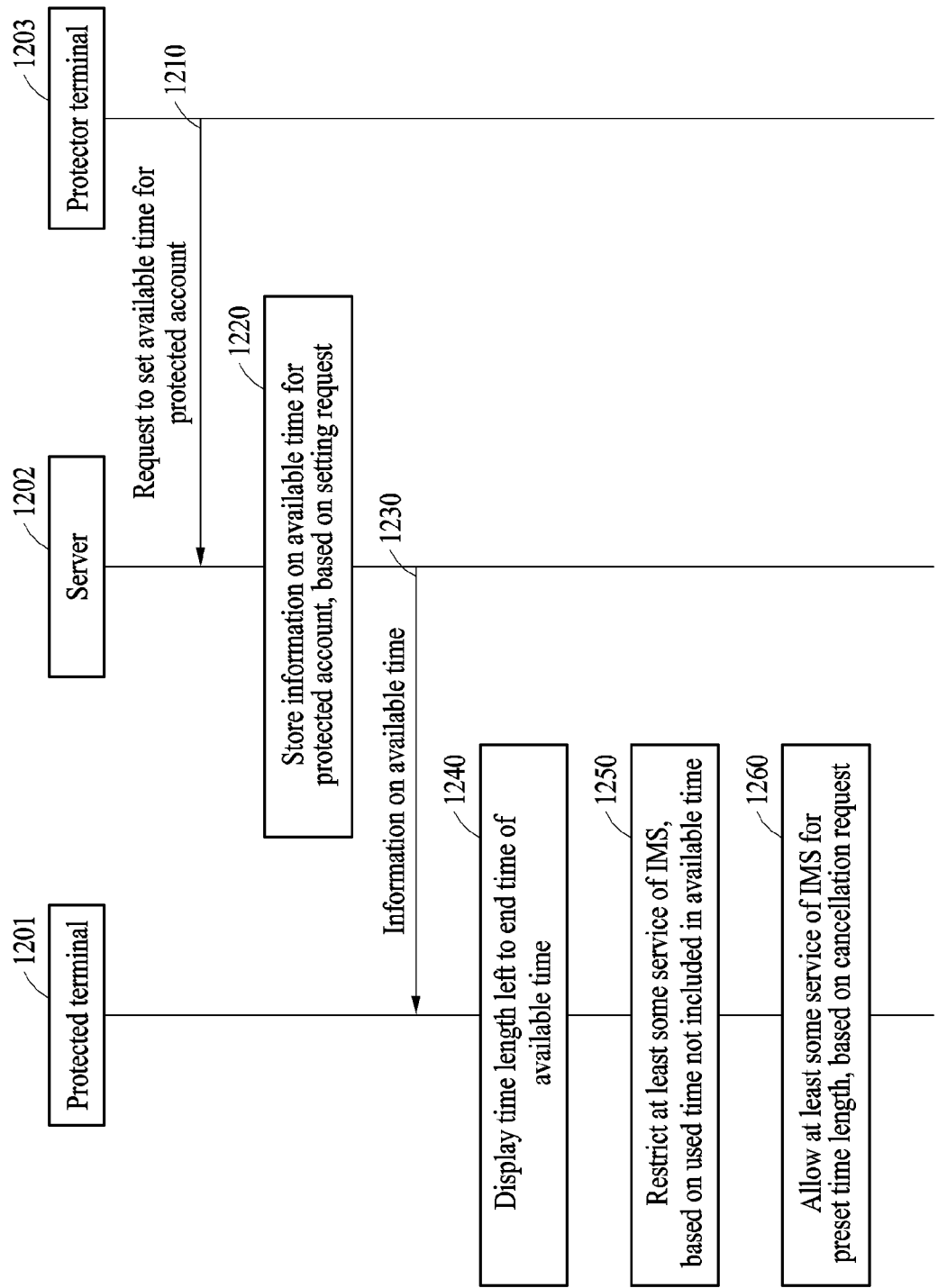
FIG. 12 illustrates an operation of setting an available time for a protected account in an IMS according to an embodiment.
Figure 13:
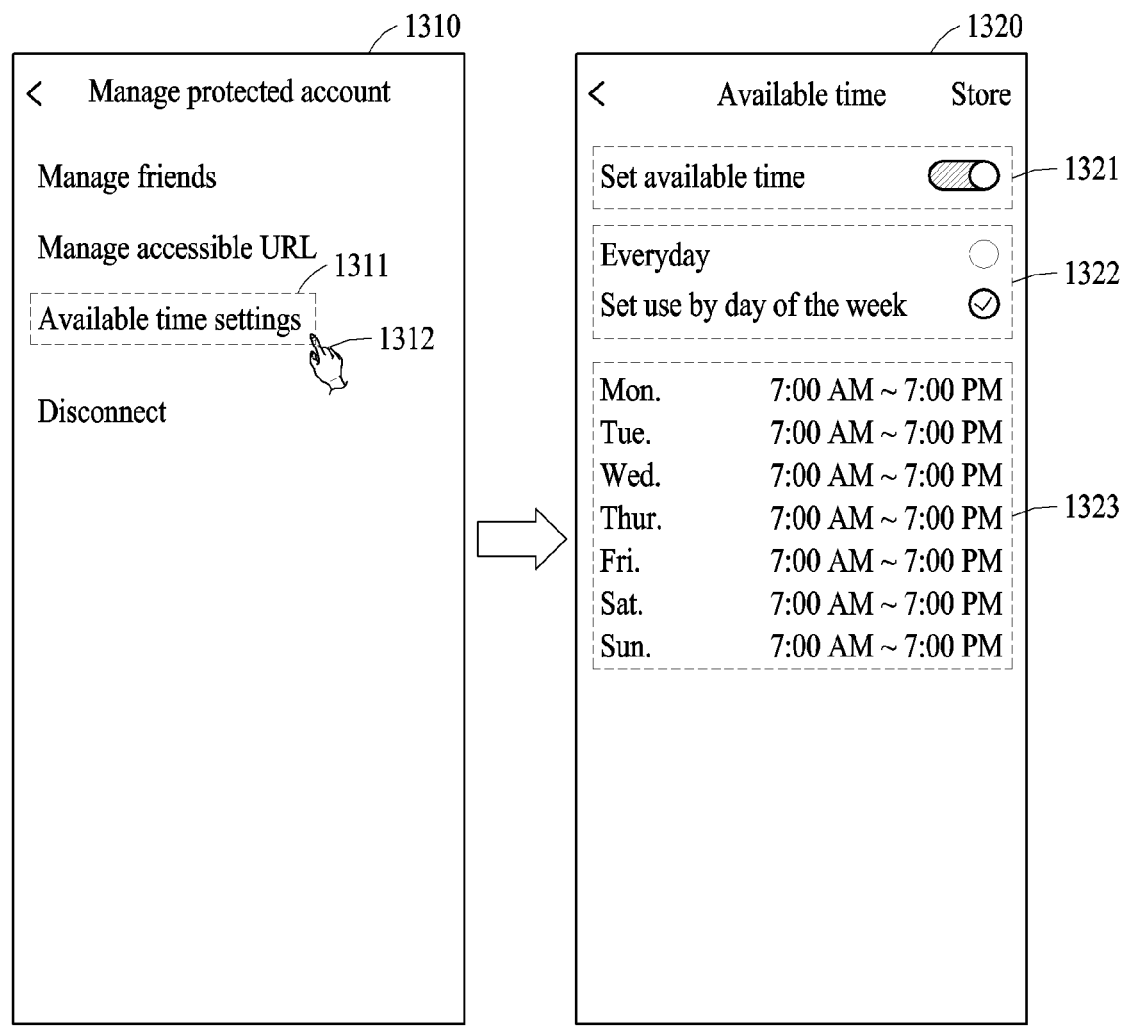
FIG. 13 illustrates an example interface of a protector terminal for setting an available time for a protected account according to an embodiment.
Figure 14:
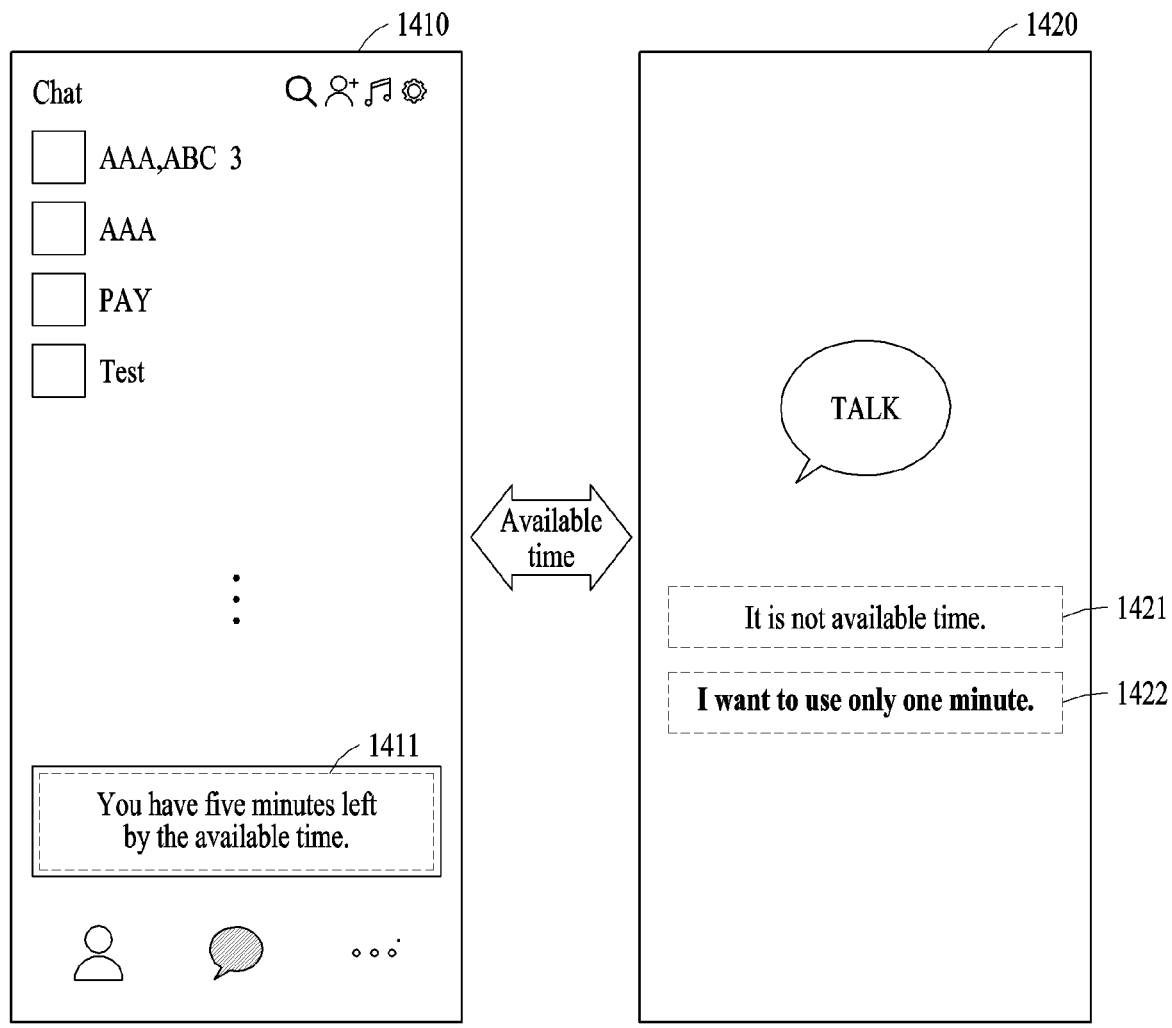
FIG. 14 illustrates an example interface of a protected terminal that is based on an available time according to an embodiment.

FIG. 12 illustrates an operation of setting an available time for a protected account in an IMS according to an embodiment. FIG. 13 illustrates an example interface of a protector terminal for setting an available time for a protected account according to an embodiment. FIG. 14 illustrates an example interface of a protected terminal that is based on an available time according to an embodiment.

In operation 1210, based on a user account being a protector account connected to another account that is a protected account, a protector terminal 1203 may transmit, to a server 1202, a request for setting an available time for the other account that is the protected account. The server 1202 may then receive, from the protector terminal 1203, the request for setting an available time for the other account that is the protected account.

The available time may refer to a time for which a protected terminal accessed with the protected account is allowed to use services provided to the protected account through an instant messaging application. In a case in which a use time is not included in the available time, the use of the services provided to the protected account may be at least partially restricted for the protected terminal accessed with the protected account.

The request for setting an available time may include information about the available time. For example, the request for setting an available time may include a start time and an end time of the available time that are specified by a protector. For another example, the request for setting an available time may include a start time and an end time of an available time allocated for each day of the week.

Referring to FIG. 13, the protector terminal 1203 may display a protected interface 1310 for managing the protected account. The protected interface 1310 may include respective areas for a friend list of the protected account, links to which access is allowed, and an available time. Based on detecting an input (e.g., a touch input) 1312 in an area 1311 for an available time, the protector terminal 1203 may display an available time setting interface 1320. The available time setting interface 1320 may include an area 1321 for activating and deactivating an available time, an area 1322 for setting modes of an available time, and an area 1323 for setting an available time by day of the week.

Based on detecting an input in the area 1321, the protector terminal 1203 may switch activation and deactivation of an available time managing function for the protected account. Based on the available time managing function being activated, the protector terminal 1203 may display an interface in which the area 1322 for setting modes of an available time is activated.

Based on detecting an input in an area corresponding to "every day" in the area 1322, the protector terminal 1203 may display an interface (not shown) for a setting request including a start time and an end time of an available time for "every day" (e.g., without division by day of the week).

Based on detecting an input in an area corresponding to "use setting by day of the week" in the area 1322, the protector terminal 1203 may display an interface including the area 1323 for a setting request including a start time and an end time of an available time allocated for each day of the week.

In operation 1220, the server 1202 may store information associated with the available time of the protected account based on the setting request for setting the available time. For example, based on receiving the setting request for the availability time from the protector terminal 1203 accessed with a first user account that is the protector account, the server 1202 may obtain a second user account that is the protected account connected to the first user account. For example, the server 1202 may have information about a family account group including the first user account that is the protector account and the second user account that is the protected account. Based on the stored information about the family account group, the server 1202 may obtain the second user account that is the protected account connected to the first user account. Based on the setting request for the available time received from the protector terminal 1203 accessed with the first user account, the server 1202 may store information associated with an available time for the second user account.

In operation 1230, the server 1202 may transmit the information associated with the available time to a protected terminal 1201. The protected terminal 1201 may then receive the information associated with the available time from the server 1202.

According to an embodiment, based on a user account being a protected account, the server 1202 may transmit, to a user terminal (e.g., the protected terminal 1201), an account type (e.g., the protected account) of the user account at a predetermined interval (e.g., at an interval of one minute). According to an embodiment, based on the user account being the protected account, the server 1202 may transmit an account type (e.g., the protected account) of the user account during communication between a user terminal (e.g., the protected terminal 1201) and the server 1202. Based on receiving the account type of the user account from the server 1202, the protected terminal 1201 may request the server 1202 for the information associated with an available time. For example, the protected terminal 1201 may transmit, to the server 1202, the request for the information associated with an available time. The server 1202 may receive, from the protected terminal 1201, the request for the information associated with an available time. Based on receiving the request for the information associated with an available time from the protected terminal 1201, the server 1202 may transmit the information associated with an available time to the protected terminal 1201. The protected terminal 1201 may then receive the information associated with an available time from the server 1202.

For reference, according to an embodiment, based on the user account being the protector account connected to another account that is the protected account, the server 1202 may transmit an account type (e.g., the protector account) of the user account to a user terminal (e.g., the protector terminal 1203) at a predetermined interval (e.g., at an interval of one minute). According to an embodiment, based on the user account being the protector account connected to another account that is the protected account, the server 1202 may transmit an account type (e.g., the protector account) of the user account during communication between a user terminal (e.g., the protector terminal 1203) and the server 1202.

According to an embodiment, based on storing information associated with an available time for the protected account based on the request for setting an available time received from the protector terminal 1203, the server 1202 may transmit the information associated with an available time to the protected terminal 1201. The protected terminal 1201 may receive the information associated with an available time from the server 1202.

In operation 1240, the protected terminal 1201 may display a guidance message about a remaining available time. The remaining available time may refer to a time length from a use time (e.g., a current time) to an end time of the available time. According to an embodiment, based on the remaining available time being one of predetermined time lengths, the protected terminal 1201 may display the guidance message. The guidance message about the remaining available time may include the information associated with the available time. The guidance message about the remaining available time may include, for example, an available time including a remaining available time and/or a use time, and a start time of another available time (e.g., a subsequent available time).

Referring to FIG. 14, based on the remaining available time being one of predetermined time lengths, the protected terminal 1201 may display an interface 1410 including a guidance message 1411.

In operation 1250, based on the use time not being included in the available time, the protected terminal 1201 may restrict at least one of the services provided to the protected account.

According to an embodiment, based on the use time not being included in the available time, the protected terminal 1201 may restrict the services provided to the protected. For example, the protected terminal 1201 may restrict a chat service and a friend list service.

Based on the use time not being included in the available time, the protected terminal 1201 may display a use restriction interface 1420. Based on the use time changing from a time within the available time to a time out of the available time, the protected terminal 1201 may display the use restriction interface 1420 that is changed from the interface 1410 for services provided to the protected account. Relative positions of the use time and the available time may change over time. For example, the use time may change from the time within the available time to the time out of the available time, by the lapse of time.

The use restriction interface 1420, an interface in which at least one of the services is restricted, may include a guidance message 1421. The guidance message 1421 of the use restriction interface 1420 may include a message indicating that the IMS is not available because it is not the available time. For example, the guidance message 1421 may further include a message about an available time including a use time and a start time of another available time (e.g., a subsequent available time).

According to an embodiment, based on the use time not being included in the available time, the protected terminal 1201 may restrict at least one of the services provided to the protected account. For example, based on the use time not being included in the available time, the protected terminal 1201 may restrict the chat service among the chat service and the friend list service. Regardless of whether the use time is included in the available time, the protected terminal 1201 may maintain providing at least one of the services provided to the protected account. That is, the protected terminal 1201 may provide the at least one service even when the use time is not included in the available time. For example, the protected terminal 1201 may maintain providing the friend list service regardless of (e.g., independently of) the available time.

According to an embodiment, based on the use time not being included in the available time, the protected terminal 1201 may partially restrict at least one of the services provided to the protected account.

For example, based on the use time not being included in the available time, the protected terminal 1201 may partially restrict the friend list service. The protected terminal 1201 may display another user account included in a friend list of the user account that is the protected account through the friend list service. Based on the use time being included in the available time, when profile information (e.g., a profile image, a status message, etc.) of the other user account included in the friend list is updated, the protected terminal 1201 may receive the updated profile information from the server 1202 and display the updated profile information through the friend list service. In contrast, based on the use time not being included in the available time, the protected terminal 1201 may only be able to display the profile information of the other user account at an end time of the available time through the friends list service, and may restrict displaying the profile information updated after the end time of the available time.

For another example, based on the use time not being included in the available time, the protected terminal 1201 may partially restrict the chat service. The protected terminal 1201 may transmit and/or receive messages with another user account through the chat service. Based on the use time being included in the available time, when the user account receives and/or transmits a message from and/or to another user account through the chat service, the protected terminal 1201 may receive the message from the server 1202 and display an updated chatroom. In contrast, based on the use time not being included in the available time, the protected terminal 1201 may only be able to display a chatroom for a chat up to the end time of the available time through the chat service, and may restrict displaying the chatroom updated after the end time of the available time.

For another example, based on the use time not being included in the available time, the protected terminal 1201 may partially restrict the chat service. The protected terminal 1201 may restrict at least one of a plurality of functions provided to the protected account through the chat service.

The plurality of functions provided to the protected account through the chat service may include, for example, a notice function in a chatroom, a chat search function, and a shared calendar function in a chatroom. The notice function in a chatroom may refer to a function of setting and/or searching a notice between user accounts participating in the chatroom. The chat search function may refer to a function of displaying messages transmitted and received in the chatroom. The shared calendar function in a chatroom may refer to a function of sharing a calendar (e.g., schedule) between user accounts participating in the chatroom.

Based on the use time not being included in the available time, the protected terminal 1201 may restrict the chat search function among the notice function in a chatroom, the chat search function, and the shared calendar function of the chat service. The protected terminal 1201 may maintain at least one of the functions of the chat service, regardless of whether the use time is included in the available time. That is, even when the use time is not included in the available time, the protected terminal 1201 may perform at least one function. For example, the protected terminal 1201 may maintain providing the notice function and the shared calendar function of the chat service, regardless of (or independently of) the available time. Even when the use time is not included in the available time, the protected terminal 1201 may display a notice in a chatroom and/or schedules stored in a shared calendar.

In operation 1260, based on obtaining a cancellation request while the at least one service is restricted, the protected terminal 1201 may allow the restricted at least one service.

Based on the use time not being included in the available time, the protected terminal 1201 may display the use restriction interface 1420. The use restriction interface 1420 may further include an area 1422 for requesting cancellation, along with the guidance message 1421. Based on detecting an input (e.g., a touch input) in the displayed area 1422 for requesting cancellation, the protected terminal 1201 may obtain a cancellation request. For example, the protected terminal 1201 may obtain a cancellation request corresponding to a predetermined time length. For another example, the area 1422 for requesting cancellation may include a subarea (not shown) allocated to each of a plurality of time lengths. Based on detecting an input (e.g., a touch input) in the subarea, the protected terminal 1201 may obtain a cancellation request corresponding to a time length corresponding to the subarea.

Based on the cancellation request, the protected terminal 1201 may allow the restricted at least one service. For example, the protected terminal 1201 may allow the restricted at least one service for a predetermined time length. For another example, the cancellation request may include information about a time length, and the protected terminal 1201 may allow the restricted at least one service for the time length corresponding to the cancellation request.

Based on the lapse of the predetermined time length from a time point at which the cancellation request is received, the protected terminal 1201 may re-restrict the allowed at least one service. Based on receiving a cancellation request after the at least one service is restricted again, the protected terminal 1201 may disregard the cancellation request. The protected terminal 1201 may allow the restricted service a predetermined number of times (e.g., once).

The protected terminal 1201 may initialize the number of times the restricted service is allowed, based on the use time changing from the time out of the available time to the time within the available time. For example, based on the use time being a start time of the available time, the protected terminal 1201 may initialize the number of times the restricted service is allowed. Based on obtaining a cancellation request after entering the available time, the protected terminal 1201 may temporarily allow the restricted service.

Additionally, based on the use time changing from the time out of the available time to the time within the available time, the protected terminal 1201 may display the interface 1410 for services provided to the protected account that is changed from the use restriction interface 1420.

According to an embodiment, a server may include a communicator, a memory, and a processor.

The processor may transmit an account type of a user account to a user terminal via the communicator.

The processor may receive a link connection request for connecting to a link from a protected terminal via the communicator. The processor may transmit an approval request to a protector terminal via the communicator. The processor may receive a reply to the approval request from the protector terminal via the communicator. The processor may transmit information about the reply to the approval request to the protected terminal. Based on the approval reply, the processor may transmit a page corresponding to the link to the protected terminal.

According to an embodiment, a user terminal (e.g., a protector terminal, a protected terminal, etc.) may include a communicator, a memory, a display, and a processor.

The processor may receive an account type of a user account from a server via the communicator. The memory may temporarily and/or permanently store information about the account type of the user account, information about a general interface (e.g., a protector interface), and/or information about a protected interface. The display may be implemented as, for example, a touch display, and may receive an input associated with the link connection request and/or visually output the general interface (e.g., the protector interface) and/or the protected interface.

Operations of each component of the server and the user terminal are not limited to what has been described above, and operations described above with reference to FIGS. 1 to 14 may also be applied to the server and the user terminal.

The example embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as, parallel processors.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording media.

The methods according to the above-described examples may be recorded in non-transitory computer-readable media including program instructions to implement various operations of the above-described examples. The media may also include, alone or in combination with the program instructions, data files, data structures, and like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM disks, DVDs, and/or Blue-ray disks; magneto-optical media such as optical disks; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An operation method of a user terminal, comprising:
accessing an instant messaging server with a user account;
based on the user account being a general account, displaying a general interface for a plurality of services provided to the general account;
based on the user account being a protected account, displaying a protected interface in which at least some of the plurality of services provided to the general account are restricted,
wherein the protected interface is an interface from which, of an integrated search result based on a user input in an instant messaging service, content associated with the at least some service restricted for the protected account is excluded,
based on the user account being the protected account, receiving, from the instant messaging server, information associated with an available time set by another account that is a protector account connected to the user account;
based on a use time not being comprised in the received information associated with the available time, restricting at least one of a plurality of services provided to the protected account;
based on obtaining a cancellation request during restriction of the at least one service, allowing the restricted at least one service for a selected time length from a time point at which the cancellation request is obtained; and
based on a lapse of the selected time length from the time point at which the cancellation request is obtained, re-restricting the allowed at least one service.

2. The operation method of claim 1, wherein the displaying of the protected interface further comprises:
displaying an interface with an advertisement removed.

3. The operation method of claim 1, wherein the displaying of the protected interface further comprises:
restricting access that is based on the protected account to a non-friend-based chatroom accessible using a link.

4. The operation method of claim 1, wherein the displaying of the protected interface further comprises:
displaying an interface from which a graphical representation for executing a web search function based on a keyword input in a chatroom is removed.

5. The operation method of claim 1, wherein the displaying of the general interface comprises:
based on the user account being a protector account connected to another account that is the protected account, displaying a protector interface for a management service for managing the other account.

6. The operation method of claim 5, wherein the displaying of the protector interface comprises:
displaying an interface for setting at least one of a friend list, an access-allowed link, or an available time of the other account that is the protected account.

7. The operation method of claim 1, further comprising:
in response to the user account changing from the protected account to the general account, stopping displaying the protected interface to start displaying the general interface; and
in response to the user account changing from the general account to the protected account, stopping displaying the general interface to start displaying the protected interface.

8. The operation method of claim 1, further comprising:
requesting to add a business account as a friend; and
based on the user account being the protected account, providing a guidance message about restricting adding the business account to a friend list of the user account.

9. The operation method of claim 1, further comprising:
displaying a notification message received via the instant messaging server, from a business account to the user account.

10. The operation method of claim 1, further comprising:
receiving, from the instant messaging server, a message comprising a link; and
based on the user account being the protected account, restricting displaying an image associated with the link.

11. The operation method of claim 1, further comprising:
based on that a link selected in an instant messaging application accessed with the user account that is the protected account indicates access to a chatroom, displaying information associated with the access to the chatroom within the instant messaging application; and
based on that the link selected in the instant messaging application accessed with the user account that is the protected account indicates access to a page other than the chatroom, transmitting the link to an external browser application.

12. The operation method of claim 1, further comprising:
based on a link being selected in an instant messaging application, transmitting, to the instant messaging server, a link connection request for a connection to the selected link;
based on an approval reply from another account that is a protector account connected to the user account that is the protected account, receiving a page corresponding to the link from the instant messaging server; and
based on a rejection reply from the other account that is the protector account, restricting the connection to the link.

13. The operation method of claim 12, wherein the transmitting of the link connection request comprises:
displaying a guidance message about transmitting an approval request for the link connection request to the other account that is the protector account connected to the user account that is the protected account; and
based on that a confirmation reply to the guidance message about transmitting the approval request is selected, transmitting the link connection request.

14. The operation method of claim 12, further comprising:
displaying a guidance message corresponding to a reply from the other account that is the protector account connected to the user account that is the protected account.

15. The operation method of claim 1, further comprising:
based on the user account being a protector account connected to another account that is the protected account, transmitting, to the instant messaging server, an available time setting request for setting an available time for the other account that is the protected account.

16. A non-transitory computer-readable storage medium storing instructions that, when executed by a processor, cause the processor to perform an operation method comprising:
accessing an instant messaging server with a user account;
based on the user account being a general account, displaying a general interface for a plurality of services provided to the general account;
based on the user account being a protected account, displaying a protected interface in which at least some of the plurality of services provided to the general account are restricted, wherein the protected interface is an interface from which, of an integrated search result based on a user input in an instant messaging service, content associated with the at least some service restricted for the protected account is excluded, based on the user account being the protected account, receiving, from the instant messaging server, information associated with an available time set by another account that is a protector account connected to the user account;

based on a use time not being comprised in the received information associated with the available time, restricting at least one of a plurality of services provided to the protected account;

based on obtaining a cancellation request during restriction of the at least one service, allowing the restricted at least one service for a selected time length from a time point at which the cancellation request is obtained; and based on a lapse of the selected time length from the time point at which the cancellation request is obtained, re-restricting the allowed at least one service.

17. A user terminal, comprising:

a processor configured to:

access an instant messaging server with a user account;

based on the user account being a general account, display a general interface for a plurality of services provided to the general account;

based on the user account being a protected account, display a protected interface in which at least some of the plurality of services provided to the general account is restricted, wherein the protected interface is an interface from which, of an integrated search result based on a user input in an instant messaging service, content associated with the at least some service restricted for the protected account is excluded, based on the user account being the protected account, receive, from the instant messaging server, information associated with an available time set by another account that is a protector account connected to the user account;

based on a use time not being comprised in the received information associated with the available time, restrict at least one of a plurality of services provided to the protected account;

based on obtaining a cancellation request during restriction of the at least one service, allow the restricted at least one service for a selected time length from a time point at which the cancellation request is obtained; and based on a lapse of the selected time length from the time point at which the cancellation request is obtained, re-restrict the allowed at least one service.

* * * * *